United States Patent
Murata et al.

(10) Patent No.: US 8,289,543 B2
(45) Date of Patent: Oct. 16, 2012

(54) IMAGE FORMING APPARATUS, IMAGE FORMING SYSTEM, AND IMAGE FORMING METHOD

(75) Inventors: Yumiko Murata, Kanagawa (JP); Hiroki Hiraguchi, Kanagawa (JP); Tomofumi Harada, Kanagawa (JP); Ryonosuke Miyazaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 926 days.

(21) Appl. No.: 12/041,334

(22) Filed: Mar. 3, 2008

(65) Prior Publication Data

US 2008/0218792 A1    Sep. 11, 2008

(30) Foreign Application Priority Data

Mar. 9, 2007    (JP) ................. 2007-060658

(51) Int. Cl.
*G06K 15/00* (2006.01)
*G06F 3/12* (2006.01)
(52) U.S. Cl. .............. 358/1.15; 358/1.13; 358/1.14; 358/1.16; 358/1.18
(58) Field of Classification Search ............ None
See application file for complete search history.

(56) References Cited

U.S. PATENT DOCUMENTS

| | | | |
|---|---|---|---|
| 6,466,329 B1 * | 10/2002 | Mukai | 358/1.15 |
| 6,661,933 B1 * | 12/2003 | Hisatomi et al. | 382/306 |
| 2001/0050781 A1 * | 12/2001 | Kujirai | 358/1.15 |
| 2004/0257612 A1 * | 12/2004 | Okabe et al. | 358/1.15 |
| 2005/0174601 A1 * | 8/2005 | Sawada | 358/1.15 |
| 2006/0200867 A1 * | 9/2006 | Yoshida | 726/27 |
| 2007/0253018 A1 * | 11/2007 | Doui | 358/1.15 |

FOREIGN PATENT DOCUMENTS

| | | |
|---|---|---|
| JP | 2005-222372 | 8/2005 |
| JP | 2006-80939 | 3/2006 |
| JP | 2006-115020 | 4/2006 |

OTHER PUBLICATIONS

U.S. Appl. No. 12/042,083, filed Mar. 4, 2008, Miyazaki, et al.

* cited by examiner

*Primary Examiner* — Benny Q Tieu
*Assistant Examiner* — Haris Sabah
(74) *Attorney, Agent, or Firm* — Oblon, Spivak, McClelland, Maier & Neustadt, L.L.P.

(57) ABSTRACT

A scanner unit reads a code image from a recording medium. A detecting unit detects a medium identification from the code image. An identification obtaining unit obtains image identifications of all images included in a print unit that is identified by a unit identification and a print condition corresponding to the medium identification, from an identification storing unit. An image obtaining unit obtains all images corresponding to the image identification from an image storing unit. A printing unit prints the image obtained by the image obtaining unit under the print condition obtained by the identification obtaining unit.

17 Claims, 16 Drawing Sheets

1122

| PID | EID | PARENT PID | BID | SET CANCEL FLAG | JID | JOB CANCEL FLAG | PRINT SETTING | JOB OWNER | ACCESS- PERMITTED USER |
|---|---|---|---|---|---|---|---|---|---|
| 1 | 1 | - | 1 | 0 | 1 | 0 | DOUBLE-SIDED PRINT, PUNCH | abc | cdf, efg |
| 2 | 2 | - | 1 | 0 | 1 | 0 | DOUBLE-SIDED PRINT, PUNCH | abc | cdf, efg |
| 3 | 1 | - | 2 | 0 | 1 | 0 | DOUBLE-SIDED PRINT, PUNCH | abc | cdf, efg |
| 4 | 2 | - | 2 | 0 | 1 | 0 | DOUBLE-SIDED PRINT, PUNCH | abc | cdf, efg |
| 5 | 1 | 1 | 3 | 0 | 2 | 0 | SINGLE-SIDED PRINT, STAPLE | ccc | hii, yoo, koo |
| 6 | 2 | 2 | 3 | 0 | 2 | 0 | SINGLE-SIDED PRINT, STAPLE | ccc | hii, yoo, koo |
| 7 | 1 | 3 | 4 | 0 | 2 | 0 | SINGLE-SIDED PRINT, STAPLE | ccc | hii, yoo, koo |
| 8 | 2 | 4 | 4 | 0 | 2 | 0 | SINGLE-SIDED PRINT, STAPLE | ccc | hii, yoo, koo |

FIG. 4

| PID | EID | PARENT PID | BID | SET CANCEL FLAG | JID | JOB CANCEL FLAG | PRINT SETTING |
|---|---|---|---|---|---|---|---|
| 1 | 1 | – | 1 | 0 | 1 | 0 | DOUBLE-SIDED PRINT, PUNCH |
| 2 | 2 | – | 1 | 0 | 1 | 0 | DOUBLE-SIDED PRINT, PUNCH |
| 3 | 1 | – | 2 | 0 | 1 | 0 | DOUBLE-SIDED PRINT, PUNCH |
| 4 | 2 | – | 2 | 0 | 1 | 0 | DOUBLE-SIDED PRINT, PUNCH |
| 5 | 1 | 1 | 3 | 0 | 2 | 0 | SINGLE-SIDED PRINT, STAPLE |
| 6 | 2 | 2 | 3 | 0 | 2 | 0 | SINGLE-SIDED PRINT, STAPLE |
| 7 | 1 | 3 | 4 | 0 | 2 | 0 | SINGLE-SIDED PRINT, STAPLE |
| 8 | 2 | 4 | 4 | 0 | 2 | 0 | SINGLE-SIDED PRINT, STAPLE |

FIG. 7

| PID | EID | PARENT PID | BID | SET CANCEL FLAG | JID | JOB CANCEL FLAG | PRINT SETTING |
|---|---|---|---|---|---|---|---|
| 1 | 1 | - | 1 | 0 | 1 | 0 | DOUBLE-SIDED PRINT, PUNCH |
| 2 | 2 | - | 1 | 0 | 1 | 0 | DOUBLE-SIDED PRINT, PUNCH |
| 3 | 1 | - | 2 | 0 | 1 | 0 | DOUBLE-SIDED PRINT, PUNCH |
| 4 | 2 | - | 2 | 0 | 1 | 0 | DOUBLE-SIDED PRINT, PUNCH |

FIG. 8

| PID | EID | PARENT PID | BID | SET CANCEL FLAG | JID | JOB CANCEL FLAG | PRINT SETTING |
|---|---|---|---|---|---|---|---|
| 5 | 3 | 1 | 3 | 0 | 2 | 0 | SINGLE-SIDED PRINT, STAPLE |
| 6 | 4 | 2 | 3 | 0 | 2 | 0 | SINGLE-SIDED PRINT, STAPLE |
| 7 | 3 | 3 | 4 | 0 | 2 | 0 | SINGLE-SIDED PRINT, STAPLE |
| 8 | 4 | 4 | 4 | 0 | 2 | 0 | SINGLE-SIDED PRINT, STAPLE |
| 9 | 3 | 5 | 5 | 1 | 3 | 1 | SINGLE-SIDED PRINT, STAPLE |

FIG. 9

| PID | EID | PARENT PID | BID | SET CANCEL FLAG | JID | JOB CANCEL FLAG | PRINT SETTING |
|---|---|---|---|---|---|---|---|
| 1 | 1 | - | 1 | 0 | 1 | 0 | DOUBLE-SIDED PRINT, PUNCH |
| 2 | 2 | - | 1 | 0 | 1 | 0 | DOUBLE-SIDED PRINT, PUNCH |
| 3 | 1 | - | 2 | 0 | 1 | 0 | DOUBLE-SIDED PRINT, PUNCH |
| 4 | 2 | - | 2 | 0 | 1 | 0 | DOUBLE-SIDED PRINT, PUNCH |

FIG. 10

| PID | EID | PARENT PID | BID | SET CANCEL FLAG | JID | JOB CANCEL FLAG | PRINT SETTING |
|---|---|---|---|---|---|---|---|
| 5 | 3 | 1 | 3 | 0 | 2 | 0 | SINGLE-SIDED PRINT, STAPLE |
| 6 | 4 | 2 | 3 | 0 | 2 | 0 | SINGLE-SIDED PRINT, STAPLE |
| 7 | 3 | 3 | 4 | 0 | 2 | 0 | SINGLE-SIDED PRINT, STAPLE |
| 8 | 4 | 4 | 4 | 0 | 2 | 0 | SINGLE-SIDED PRINT, STAPLE |
| 9 | 3 | 5 | 5 | 0 | 3 | 1 | SINGLE-SIDED PRINT, STAPLE |
| 10 | 4 | 6 | 5 | 0 | 3 | 1 | SINGLE-SIDED PRINT, STAPLE |
| 11 | 3 | 7 | 6 | 1 | 3 | 1 | SINGLE-SIDED PRINT, STAPLE |

FIG. 12

| USER ID | PASSWORD |
|---|---|
| abc | 11111111 |
| cdf | 22222222 |
| efg | 33333333 |
| ccc | 44444444 |
| hii | 55555555 |
| yoo | 66666666 |
| koo | 77777777 |

FIG. 13

| PID | EID | PARENT PID | BID | SET CANCEL FLAG | JID | JOB CANCEL FLAG | PRINT SETTING | JOB OWNER | ACCESS-PERMITTED USER |
|---|---|---|---|---|---|---|---|---|---|
| 1 | 1 | - | 1 | 0 | 1 | 0 | DOUBLE-SIDED PRINT, PUNCH | abc | cdf, efg |
| 2 | 2 | - | 1 | 0 | 1 | 0 | DOUBLE-SIDED PRINT, PUNCH | abc | cdf, efg |
| 3 | 1 | - | 2 | 0 | 1 | 0 | DOUBLE-SIDED PRINT, PUNCH | abc | cdf, efg |
| 4 | 2 | - | 2 | 0 | 1 | 0 | DOUBLE-SIDED PRINT, PUNCH | abc | cdf, efg |
| 5 | 1 | 1 | 3 | 0 | 2 | 0 | SINGLE-SIDED PRINT, STAPLE | ccc | hii, yoo, koo |
| 6 | 2 | 2 | 3 | 0 | 2 | 0 | SINGLE-SIDED PRINT, STAPLE | ccc | hii, yoo, koo |
| 7 | 1 | 3 | 4 | 0 | 2 | 0 | SINGLE-SIDED PRINT, STAPLE | ccc | hii, yoo, koo |
| 8 | 2 | 4 | 4 | 0 | 2 | 0 | SINGLE-SIDED PRINT, STAPLE | ccc | hii, yoo, koo |

FIG. 14

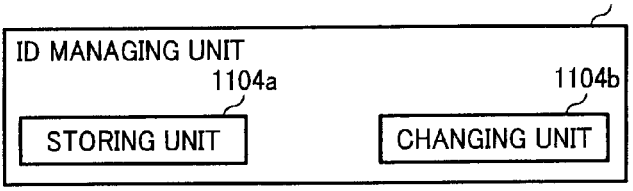

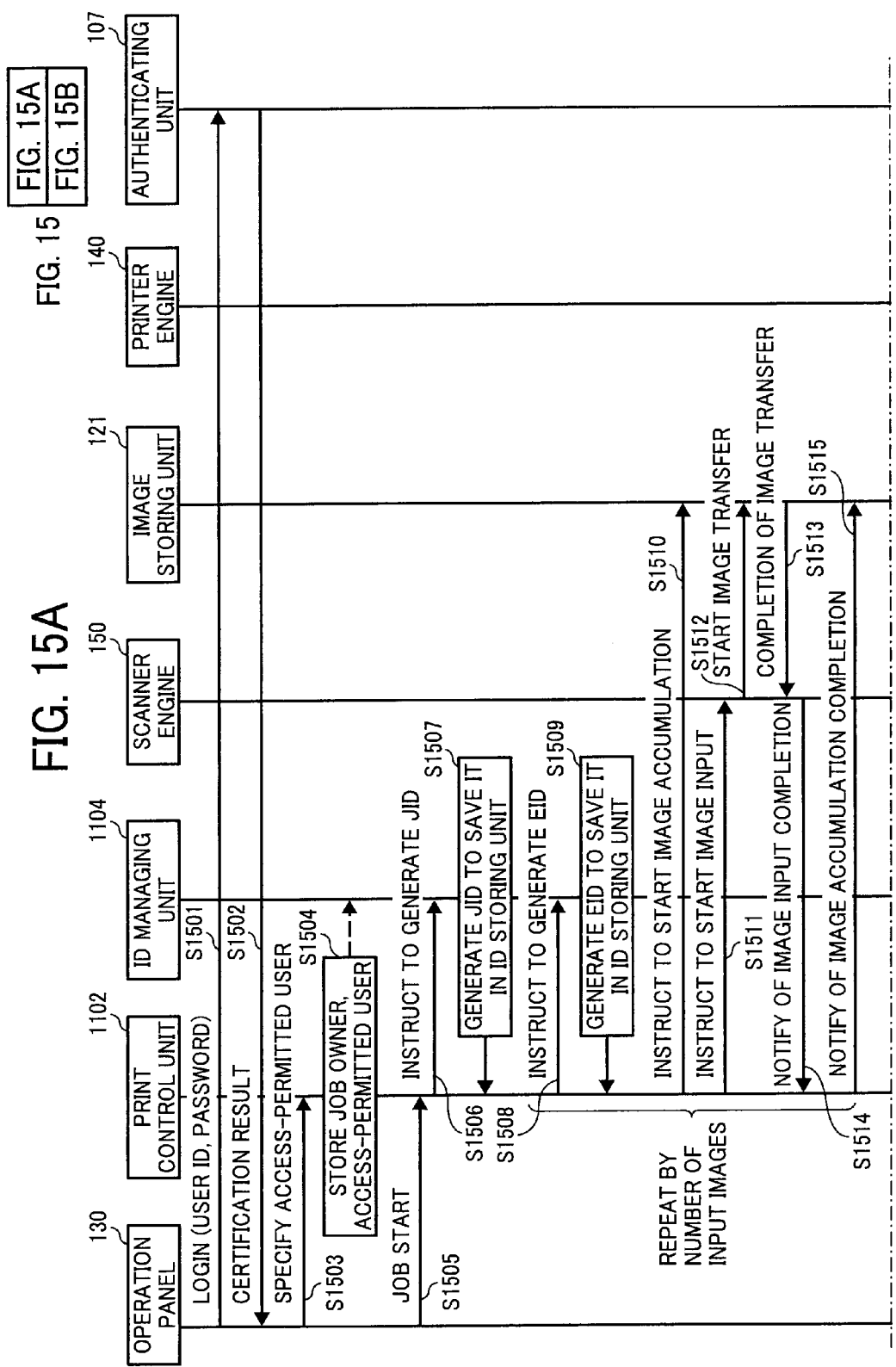

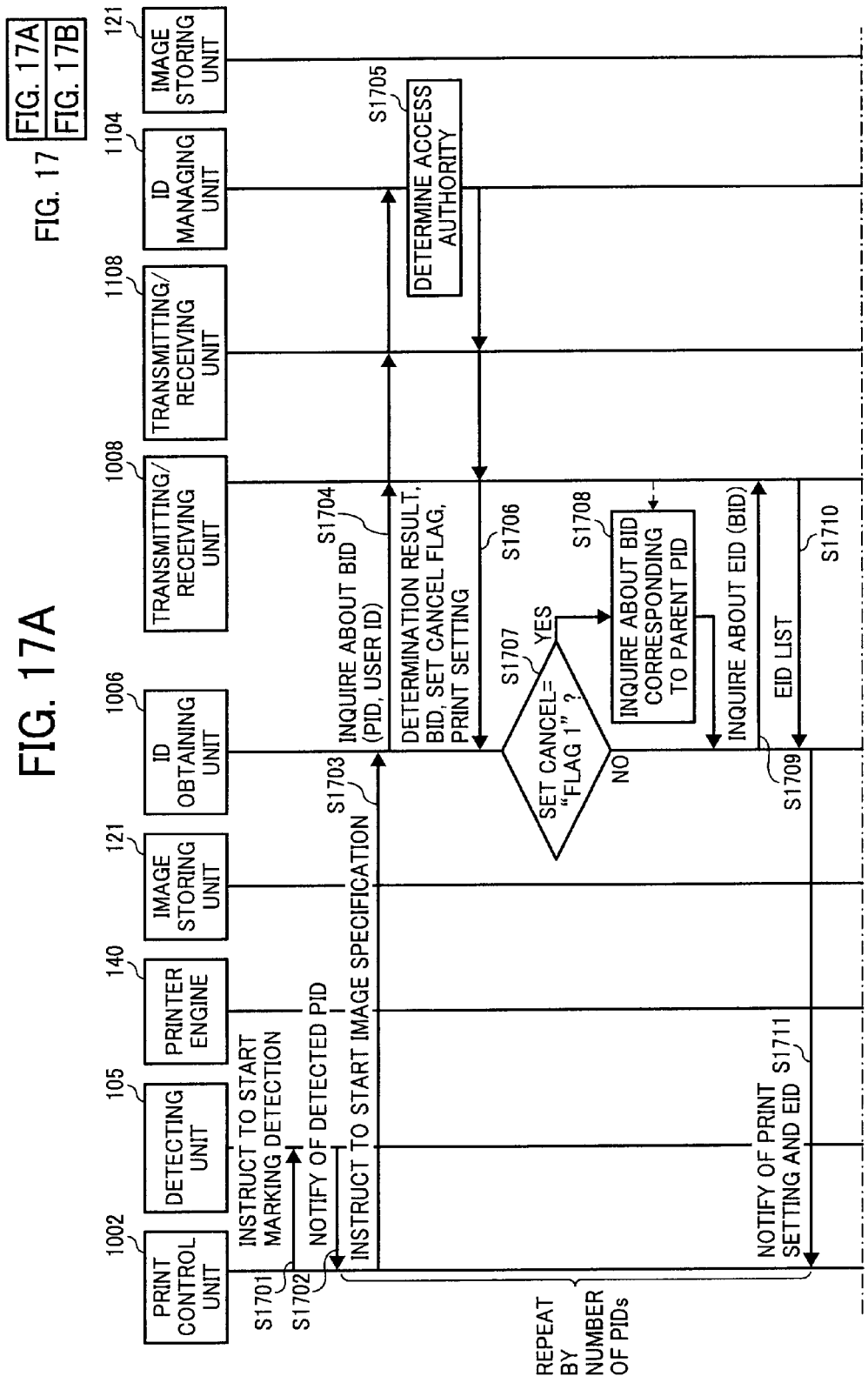

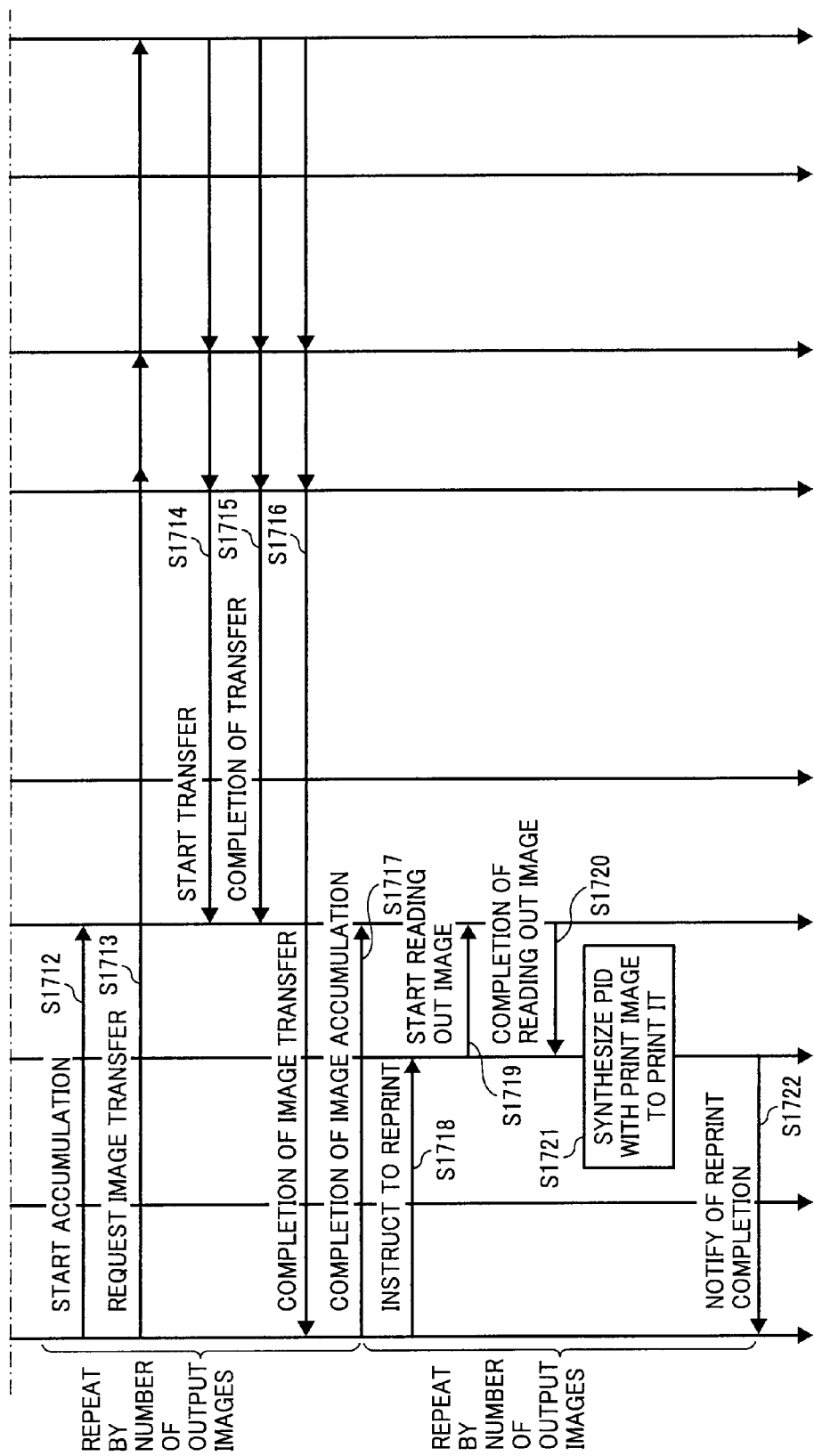

FIG. 18

SELECT JOB TO CHANGE ACCESS AUTHORITY — 1800

| JID | PRINT SETTING | DOCUMENT NAME | IP ADDRESS |
|---|---|---|---|
| 710 | SINGLE-SIDED PRINT, STAPLE | DOCUMENT A | 123.456.789.000 |
| 794 | DOUBLE-SIDED PRINT, PUNCH | DOCUMENT B | 123.456.789.000 |
| 1192 | DOUBLE-SIDED PRINT, PUNCH | DOCUMENT C | 123.456.789.000 |
| 1543 | DOUBLE-SIDED PRINT, PUNCH | DOCUMENT D | 123.456.789.000 |

1801

NEXT  PREVIOUS
1802   1803

FIG. 19

SELECT USER TO PERMIT ACCESS — 1900

ACCESS-PERMITTED USER

1901:
cdf
efg

1903: >>
1904: <<

1902:
abc
ccc
hii
yoo
koo

CHANGE   CANCEL
1905     1906

IMAGE FORMING APPARATUS, IMAGE FORMING SYSTEM, AND IMAGE FORMING METHOD

CROSS-REFERENCE TO RELATED APPLICATIONS

The present application claims priority to and incorporates by reference the entire contents of Japanese priority document, 2007-060658 filed in Japan on Mar. 9, 2007.

BACKGROUND OF THE INVENTION

1. Field of the Invention

The present invention relates to an image forming apparatus, an image forming system, and an image forming method for detecting a marking that has coded identification (ID) of printing paper to reprint an image corresponding to the ID.

2. Description of the Related Art

Recently, a scanner that reads in a manuscript image, a copying machine that prints a manuscript image read in by a scanner, a printer or a facsimile apparatus that prints image data input from outside, or a multifunction product (MFP) that has some or all of these functions, have been used. A technology has been known that reads in from a manuscript a marking such as a two-dimensional barcode where various pieces of information are embedded to control a subsequent printing process or the like based on the embedded information.

For example, Japanese Patent Application Laid-open No. 2006-80939 (hereinafter, "Patent document 1") discloses a technology to detect the two-dimensional barcode that has been added to the manuscript to decode command information that has been coded in the detected two-dimensional barcode, and then, to determine a processing relative to the read-in manuscript according to the decoded command information.

Japanese Patent Application Laid-open No. 2006-115020 (hereinafter, "Patent document 2") discloses a technology to, when the read-in image data includes two-dimensional code information, decode access information to a web server from the two-dimensional code information, and then, to obtain content data depending on the decoded access information to perform a print.

However, each method of the Patent document 1 and the Patent document 2 has a problem that it is not possible to recreate a print setting at the time of printing to print the manuscript, which has been printed in a predetermined unit such as a print job unit or a set unit, per the unit.

For example, because the method of the Patent document 1 only adds the command information that has prescribed a processing content relative to the respective manuscripts, for example, when collectively performing the print in the set unit, all manuscripts that belong to the set need to be prepared to detect the two-dimensional barcode from the respective manuscripts.

The method of the Patent document 2 enables to collectively print the whole content data obtained by referring to the access information. However, the method of the Patent document 2 is not capable of recreating the print setting at the time of printing the content data to perform a reprint. This problem results from the fact that the Patent document 2 originally intends to reduce efforts when obtaining information from an external apparatus and does not intend to read in the barcode or the like added to the manuscript at the time of printing to reprint the manuscript.

SUMMARY OF THE INVENTION

It is an object of the present invention to at least partially solve the problems in the conventional technology.

According to an aspect of the present invention, there is provided an image forming apparatus including an image storing unit that stores therein an input image and an image identification for identifying the image, in association with each other; an identification storing unit that stores therein identification information in which a unit identification for identifying a print unit formed with at least one image, the image identification of the image included in the print unit, a medium identification for identifying a recording medium on which the image is printed, and a print condition for the print unit are associated with each other; a scanner unit that reads a code image in which the medium identification is coded from the recording medium; a detecting unit that detects the medium identification from the code image read by the scanner unit; an identification obtaining unit that obtains the image identification of all images included in the print unit that is identified by the unit identification corresponding to the medium identification detected by the detecting unit and the print condition corresponding to the medium identification, from the identification storing unit; an image obtaining unit that obtains all images corresponding to the image identification obtained by the identification obtaining unit from the image storing unit; and a printing unit that prints the image obtained by the image obtaining unit under the print condition obtained by the identification obtaining unit.

Furthermore, according to another aspect of the present invention, there is provided an image forming system including a first image forming apparatus that stores therein a printed image; and a second image forming apparatus that is connected to the first image forming apparatus with a network and that prints an image. The first image forming apparatus includes an image storing unit that stores therein an input image and an image identification for identifying the image, in association with each other, an identification storing unit that stores therein identification information in which a unit identification for identifying a print unit formed with at least one image, the image identification of the image included in the print unit, a medium identification for identifying a recording medium on which the image is printed, and a print condition for the print unit are associated with each other, a first receiving unit that receives the medium identification from the second image forming apparatus, a first identification obtaining unit that obtains the image identification of all images included in the print unit that is identified by the unit identification corresponding to the medium identification and the print condition corresponding to the medium identification, from the identification storing unit, a first transmitting unit that transmits the image identification and the print condition to the second image forming apparatus, a second receiving unit that receives the image identification from the second image forming apparatus, and a second transmitting unit that obtains all images corresponding to the image identification from the image storing unit, and transmits the image to the second image forming apparatus. The second image forming apparatus includes a scanner unit that reads a code image in which the medium identification is coded from the recording medium, a detecting unit that detects the medium identification from the code image read by the scanner unit, a second identification obtaining unit that transmits the medium identification to the first image forming apparatus, receives the image identification and the print condition corresponding to the transmitted medium identification from the first image forming apparatus, and obtains the image identification of all images included in the print unit that is identified by the unit identification corresponding to the medium identification and the print condition corresponding to the medium identification, a third transmitting unit that transmits the image identification to the first image forming apparatus, a third receiving unit that receives the image corresponding to the image identification from the first image forming apparatus, and a printing unit that prints the image under the print condition.

Moreover, according to still another aspect of the present invention, there is provided an image forming method for an image forming apparatus that includes an image storing unit that stores therein an input image and an image identification for identifying the image, in association with each other and an identification storing unit that stores therein identification information in which a unit identification for identifying a print unit formed with at least one image, the image identification of the image included in the print unit, a medium identification for identifying a recording medium on which the image is printed, and a print condition for the print unit are associated with each other. The image forming method includes reading a code image in which the medium identification is coded from the recording medium; detecting the medium identification from the code image read at the reading; identification obtaining including obtaining the image identification of all images included in the print unit that is identified by the unit identification corresponding to the medium identification detected at the detecting and the print condition corresponding to the medium identification, from the identification storing unit; image obtaining including obtaining all images corresponding to the image identification obtained at the identification obtaining from the image storing unit; and printing the image obtained at the image obtaining under the print condition obtained at the identification obtaining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an explanatory table of one example of a data structure of identification information that is stored in an ID storing unit according to the first embodiment;

FIG. 7 is an explanatory table for explaining a procedure to specify an EID;

FIG. 8 is an explanatory table for explaining the procedure to specify the EID;

FIG. 9 is an explanatory table for explaining the procedure to specify the EID;

FIG. 10 is an explanatory table for explaining the procedure to specify the EID;

FIG. 12 is an explanatory table of one example of a data structure of a user-information managing table;

FIG. 13 is an explanatory table of one example of the data structure of ID information stored in an ID storing unit according to the second embodiment;

FIG. 14 is a block diagram of a detailed configuration of an ID managing unit according to the second embodiment;

FIG. 17 is a flowchart of an entire flow of a reprinting process according to the second embodiment;

FIG. 18 is an explanatory view of one example of a change-job selection display that is shown when an access-permitted user is changed;

FIG. 19 is an explanatory view of one example of a change display; and

DETAILED DESCRIPTION OF THE PREFERRED EMBODIMENTS

Exemplary embodiments of an image forming apparatus according to the present invention are described in detail below with reference to the accompanying drawings.

When printing an image in a predetermined print unit, the image forming apparatus according to a first embodiment of the present invention is based on the premise of printing a code image (hereinafter, "marking"), which has coded identification information of print paper, on each print paper sheet, and rereads in the marking on the print paper by use of a scanner, thereby allowing all images in a related print unit to be reprinted.

The image forming apparatus stores the printed image in a predetermined storing unit, and performs a printing process based on the image stored in the storing unit at the time of reprinting. Accordingly, the image can be prevented from deteriorating, compared with performing a normal copying process relative to the printed paper.

Figure 1:
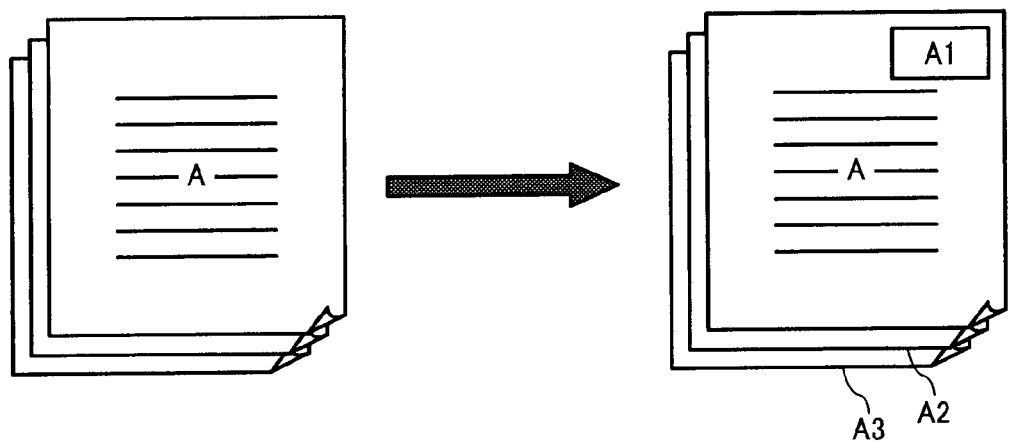
FIG. 1 is a schematic view of one example of a paper sheet that an image forming apparatus according to a first embodiment prints.

Features of the image forming apparatus according to the first embodiment will now be described with reference to FIGS. 1 and 2. FIG. 1 is a schematic view of one example of a paper sheet that the image forming apparatus according to the first embodiment prints.

As shown in FIG. 1, when a document A that includes a plurality of paper sheets is copied or printed, the marking, which has coded the identification information that uniquely identifies the paper (hereinafter, "PID"), is output onto the respective paper sheets. For example, "PID=A1" is marked on the leading paper, and "PID=A2, A3" are marked on the first and the second paper, respectively.

In a generation process of the marking, every code generating method that has been used can be used, such as a quick response (QR) code where the PID has been coded or a method that generates a two-dimensional barcode.

Figure 2:
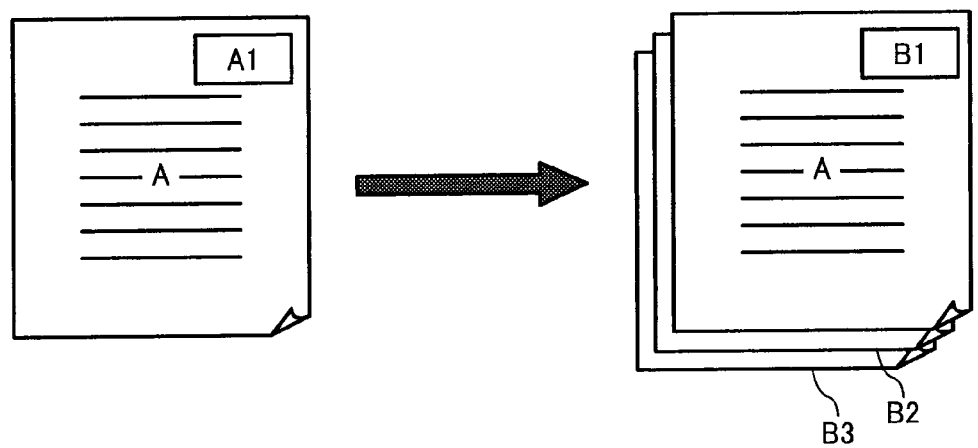
FIG. 2 is a schematic view of a reprinting process that the image forming apparatus according to the first embodiment performs.

FIG. 2 is a schematic view for explaining a reprinting process that the image forming apparatus according to the first embodiment performs. As shown in FIG. 2, in the image forming apparatus according to the first embodiment, when the paper, which is one of the paper sheets printed in FIG. 1 and the "PID=A1" has been marked on, is scanned, whereby the reprinting is designated, all paper sheets included in the print unit that has been simultaneously printed can be collectively printed, in addition to the paper of "PID=A1".

In other words, all images including not only the scanned paper of the "PID=A1", but also the paper sheets corresponding to the "PID=A2, A3" are reprinted. The markings, which have coded new PID (B1, B2, and B3), respectively, are printed on the paper at the time of reprinting.

Figure 3:
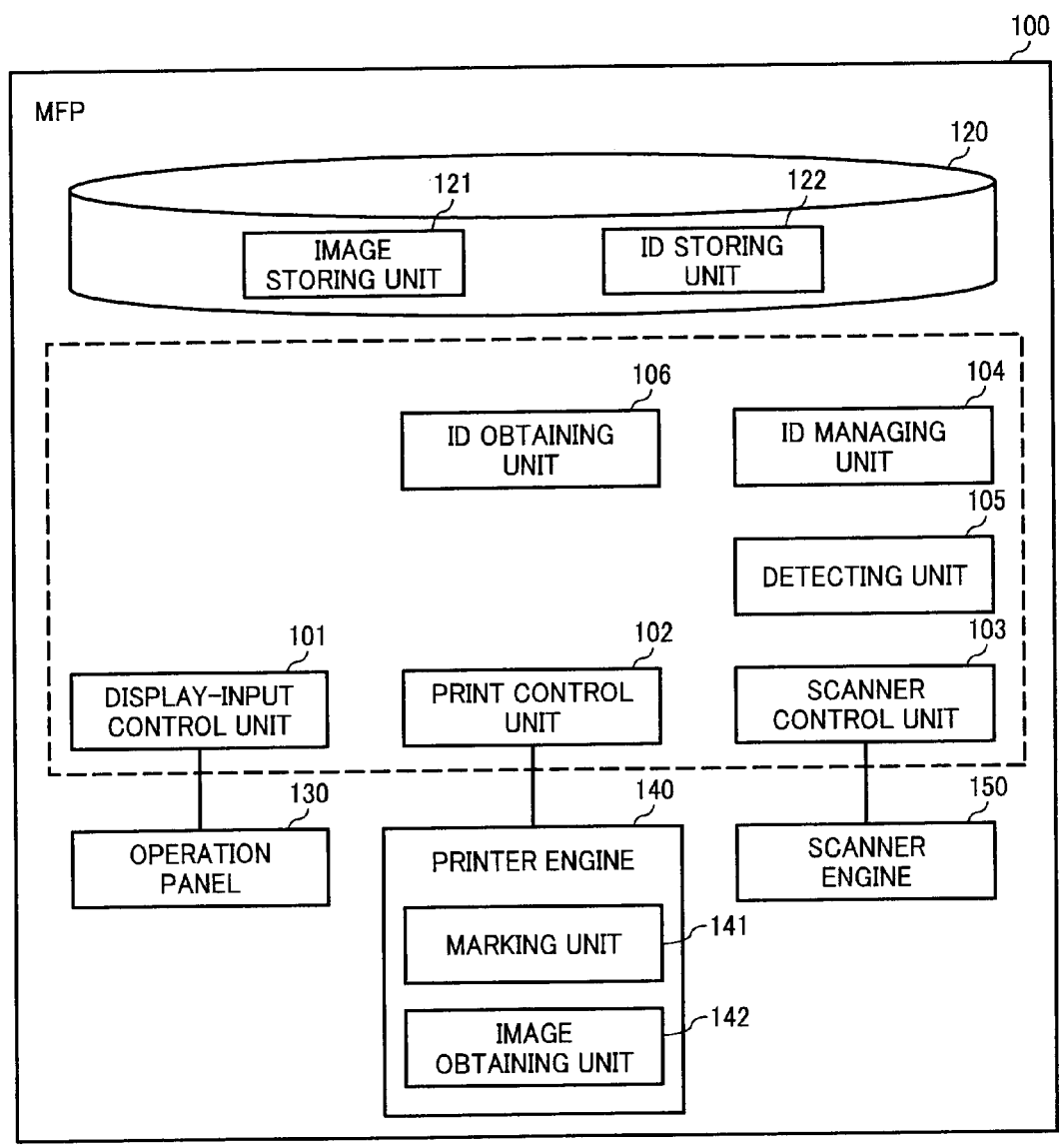
FIG. 3 is a block diagram of a configuration of an MFP product that is the image forming apparatus according to the first embodiment.

FIG. 3 is a block diagram of a configuration of an MFP 100 that is the image forming apparatus according to the first embodiment. As shown in FIG. 3, the MFP 100 according to the first embodiment includes an image storing unit 121, an ID storing unit 122, an operation panel 130, a printer engine 140, a scanner engine 150, a display-input control unit 101, a print control unit 102, a scanner control unit 103, an ID managing unit 104, a detecting unit 105, and an ID obtaining unit 106.

The image storing unit 121 stores the image that the scanner has read, and links and stores therein the image and an image ID (hereinafter, "EID") that uniquely identifies the image. The image forming apparatus may be configured in such a manner that a network interface (I/F), which is not shown, loads the image that has been input from an external image forming apparatus or the like, and then, the image storing unit 121 stores therein the image.

The ID storing unit 122 stores therein ID information where various pieces of identification information required for reprinting the image, such as the image ID, have been linked. FIG. 4 is an explanatory table of one example of a data structure of the ID information that the ID storing unit 122 according to the first embodiment has stored therein.

As shown in FIG. 4, the ID information links and stores the PID of the paper, the EID of the image that has been printed on the paper, a parent PID, a BID, a set cancel flag, a JID, a job cancel flag, and a print setting.

Each ID included in the ID information will now be described. Supposing that a process until completing a print output relative to a series of manuscript image groups, which have been input, is a one job, the ID, which has been uniquely assigned in the apparatus per the job, is referred to as the JID.

When a plurality of sets are printed in the print output, the ID, which has been uniquely assigned in the apparatus per the set, is referred to as the BID. Because one job can designate the sets of prints, a plurality of BIDs can correspond to one job.

The image storing unit 121 stores therein the image data per one page of the input image. The ID, which has been uniquely assigned relative to the stored image in the apparatus, is referred to as the EID (ID of each electronic image).

As described above, the PID means the ID per the paper, which has been uniquely assigned relative to the paper to be printed in the apparatus.

The parent PID is set in a reprinting process, and indicates the PID of the paper on which the reprinting has been based. FIG. 4 indicates an example where "PID=1, 2, 3, and 4" are set as the corresponding parent PID corresponding to the paper sheets of "PID=5, 6, 7, and 8", respectively, which have been reprinted in unit of the job to which the paper sheets of "PID=1, 2, 3, and 4" belong by scanning the paper of "PID=1".

The set cancel flag is the information indicative of whether the print of the set, to which the image serving as a print target belongs, has been canceled. With regard to the set cancel flag, when the print is canceled due to a designation from a user or an occurrence of a jam, "1" is set, and when the print is normally completed, "0" is set. Similarly, the job cancel flag means the information indicative of whether the print of the job, to which the image serving as the print target belongs, has been canceled.

The set cancel flag and the job cancel flag determine whether the print in unit of the set or of the job, respectively, has been canceled. When the reprint of the canceled set or the canceled job is designated, the set cancel flag and the job cancel flag are referred to for obtaining the adequate EID by tracking back the parent PID.

The ID storing unit 122 links and stores therein such information, whereby only a detection of the PID on arbitrary paper allows all corresponding images to be reprinted in unit of the set or of the job.

A hard disk drive (HDD) 120 stores therein the image storing unit 121 and the ID storing unit 122. The image storing unit 121 and the ID storing unit 122 can include every storage medium that is generally used, such as an optical disk, a memory card, a random access memory (RAM), except the HDD 120. The storage medium is desirably a non-volatile medium such as the HDD to read out the accumulated image information even after a power of the device has been turned off.

The operation panel 130 has a displaying unit (not shown) that displays a function setting key, the number of sets, and a message indicative of a status of the MFP 100, and input unit (not shown) that receives a key input such as a numeric keypad, a clear/stop key, a start key, a preheating key, a reset key, an initial setting key, a print key, a transmission key, and a store key. The displaying unit functions also as the input unit capable of being operated and input by use of a touch panel method, while displaying the image.

The operation panel 130 performs an instruction to scan the image and on the printing process, the instruction on the reprinting process, and the setting of a print condition at the time of printing.

The printer engine 140 forms the image data on recording paper or the like by use of an ink-jet method or an electrophotographic method, and includes a marking unit 141 and an image obtaining unit 142.

The marking unit 141 generates a marking that has coded the PID, which the print control unit 102 has designated. The printer engine 140 synthesizes the image of the marking (code image), which the marking unit 141 has generated, with the image data of the manuscript to perform printing.

The image obtaining unit 142 obtains from the image storing unit 121 the image corresponding to the EID that the ID obtaining unit 106 has obtained. The printer engine 140 prints the image that the image obtaining unit 142 has obtained.

The image forming apparatus may be configured so as to have the marking unit 141 and the image obtaining unit 142 outside the printer engine 140, and to transmit to the printer engine 140 the image where the code image generated by the marking unit 141 has been synthesized with the image data that the image obtaining unit 142 has obtained to perform printing.

The scanner engine 150 drives the scanner to perform a scan processing over the manuscript.

The display-input control unit 101 controls the display of various screens onto the displaying unit of the operation panel 130, and receives a key input event from the input unit.

The print control unit 102 controls the printer engine 140. In the present embodiment, after having once stored in the image storing unit 121 the image input from the scanner engine 150 through the instruction to print, the print control unit 102 also controls a storing processing of the image relative to the image storing unit 121 to print the stored image.

The scanner control unit 103 controls the scanner engine 150.

The ID managing unit 104 manages various IDs that the ID storing unit 122 stores therein. For example, the ID managing unit 104 generates the ID in unit of the print such as the JID or the BID per the image input and per the print output to store the ID in the ID storing unit 122. The ID managing unit 104 generates the EID of each image that has been input for printing, to link and store the EID and the JID or the like in the ID storing unit 122.

The ID managing unit 104 performs the processing to obtain various corresponding IDs in response to an inquiry to make a response. For example, when the ID managing unit 104 receives the inquiry about the BID corresponding to the PID that the detecting unit 105 has detected, the ID managing unit 104 obtains the BID corresponding to the PID from the ID storing unit 122 to return the BID to where the inquiry has made.

The detecting unit 105 detects the marking from the manuscript image read by the scanner engine 150, and decodes the detected marking, thereby detecting the PID on the manuscript.

The ID obtaining unit 106 obtains the EIDs of all images included in a print unit (a set unit or a job unit) to which the PID, which the detecting unit 105 has detected, belongs, thereby specifying the image to be reprinted. The ID obtaining unit 106 obtains the print setting that is the print condition at the time of printing the print unit to which the detected PID belongs.

Specifically, the ID obtaining unit 106 firstly inquires about the BID (JID) corresponding to the detected PID to the ID managing unit 104 to obtain the BID (JID). Then, the ID obtaining unit 106 inquires about all EIDs corresponding to the obtained BID (JID) to the ID managing unit 104 to obtain the EIDs. The ID obtaining unit 106 inquires about the print setting corresponding to the obtained BID (JID) to the ID managing unit 104 to obtain the print setting.

The image information is transmitted by use of the following transmission path. The image, which the scanner or the network I/F has input, is transmitted to the image storing unit 121 in response to the instruction from the print control unit 102. The image, which has been accumulated in the image storing unit 121, is transmitted to the printer engine 140 in response to the instruction from the print control unit 102, and then the printing is performed.

Figure 5:
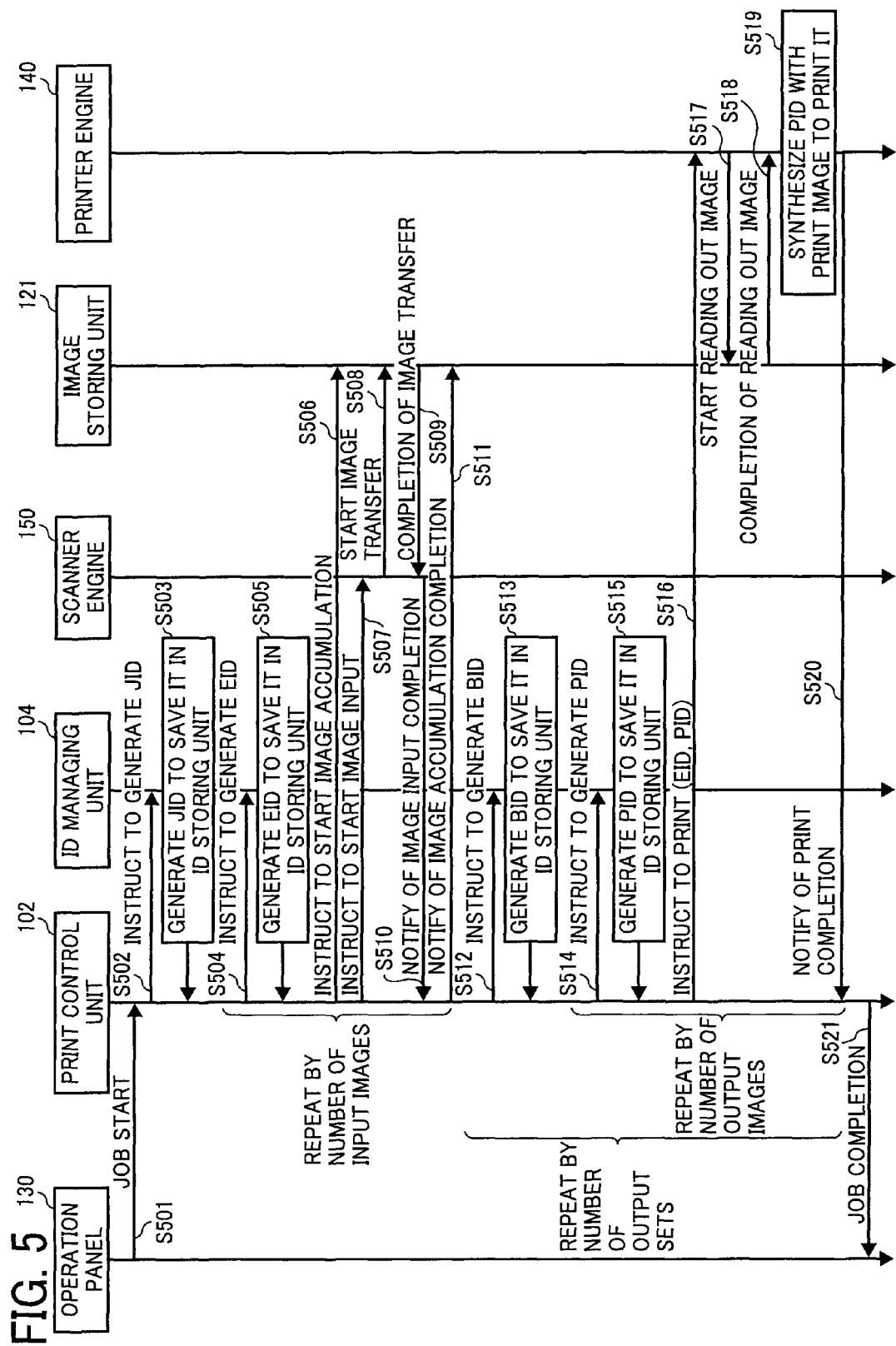
FIG. 5 is a flowchart of an entire flow of a printing process according to the first embodiment.

The printing process by use of the MFP 100 according to the first embodiment configured in this manner will now be explained. FIG. 5 is a flowchart of an entire flow of the printing process according to the first embodiment.

When the user inputs the instruction on a job start via the operation panel 130 (Step S501), the print control unit 102 transmits the instruction to generate the JID to the ID managing unit 104 (Step S502). The ID managing unit 104 newly generates a JID to store the JID in the ID storing unit 122 (Step S503).

Subsequently, the print control unit 102 repeats image-accumulation processing to read in the image by the scanner to store the image in the image storing unit 121, by the number of input images (Steps S504 to S511). When a marking print is performed relative to the accumulated image, the print control unit 102 does not perform the image-accumulation processing.

Specifically, the print control unit 102 firstly transmits the instruction to generate the EID to the ID managing unit 104 (Step S504). The ID managing unit 104 newly generates an EID to store the EID in the ID storing unit 122 (Step S505).

Subsequently, the print control unit 102 instructs the image storing unit 121 to start the image accumulation (Step S506). At this time, the image storing unit 121 prepares to store therein the image data by one page. The print control unit 102 then instructs the scanner engine 150 to start the image input (Step S507). The scanner engine 150, which has received the instruction, starts a transfer of the read image to the image storing unit 121 (Step S508).

When the transfer is completed, the image storing unit 121 notifies the scanner engine 150 of the completion of the image transfer (Step S509). The scanner engine 150 notifies the print control unit 102 of the completion of the image input (Step S510). Further, the print control unit 102 notifies the image storing unit 121 of the completion of the image data accumulation by one page (Step S511).

When the image-accumulation processing is finished, the print control unit 102 repeats an accumulated-image printing process to print the stored image by the number of sets where the output has been designated and by the image where the output has been designated (Steps S512 to S520).

Specifically, the print control unit 102 firstly transmits the instruction to generate the BID depending on the number of sets to be printed to the ID managing unit 104 (Step S512). The ID managing unit 104 newly generates a BID to store the BID in the ID storing unit 122 (Step S513).

The print control unit 102 then transmits the instruction to generate the PID to the ID managing unit 104 (Step S514). The ID managing unit 104 newly generates a PID to store the PID in the ID storing unit 122 (Step S515).

Subsequently, the print control unit 102 instructs the printer engine 140 to print the image (Step S516). The instruction to print includes the EID of the image to be printed and the PID to be coded and to be synthesized with the paper to be printed.

The image obtaining unit 142 in the printer engine 140 starts the processing to read out from the image storing unit 121 the image corresponding to the EID where the printing has been instructed (Step S517). When the read-out from the image storing unit 121 is finished (Step S518), the marking unit 141 generates the marking that has coded the PID, and then, the printer engine 140 synthesizes the generated marking with the print image to perform printing (Step S519).

When printing is completed, the printer engine 140 notifies the print control unit 102 of the print completion (Step S520).

When the accumulated-image printing process are completed relative to all sets and the images, the print control unit 102 displays the job completion on the operation panel 130 (Step S521) via the display-input control unit 101 to finish the printing process.

The reprinting process by use of the MFP 100 according to the first embodiment configured in this manner will now be explained. The reprinting process means a processing to scan the paper, on which the marking has been printed, through the printing process, thereby recreating the printing in unit of the set or of the job to which the paper belongs.

Whether the printing is recreated in unit of the set or of the job can be set in advance. Recreating the printing in unit of the set will be described below. The BID and the set cancel flag are replaced with the JID and the job cancel flag, respectively, whereby enabling the reprinting process when recreating the printing in unit of the job.

Figure 6:
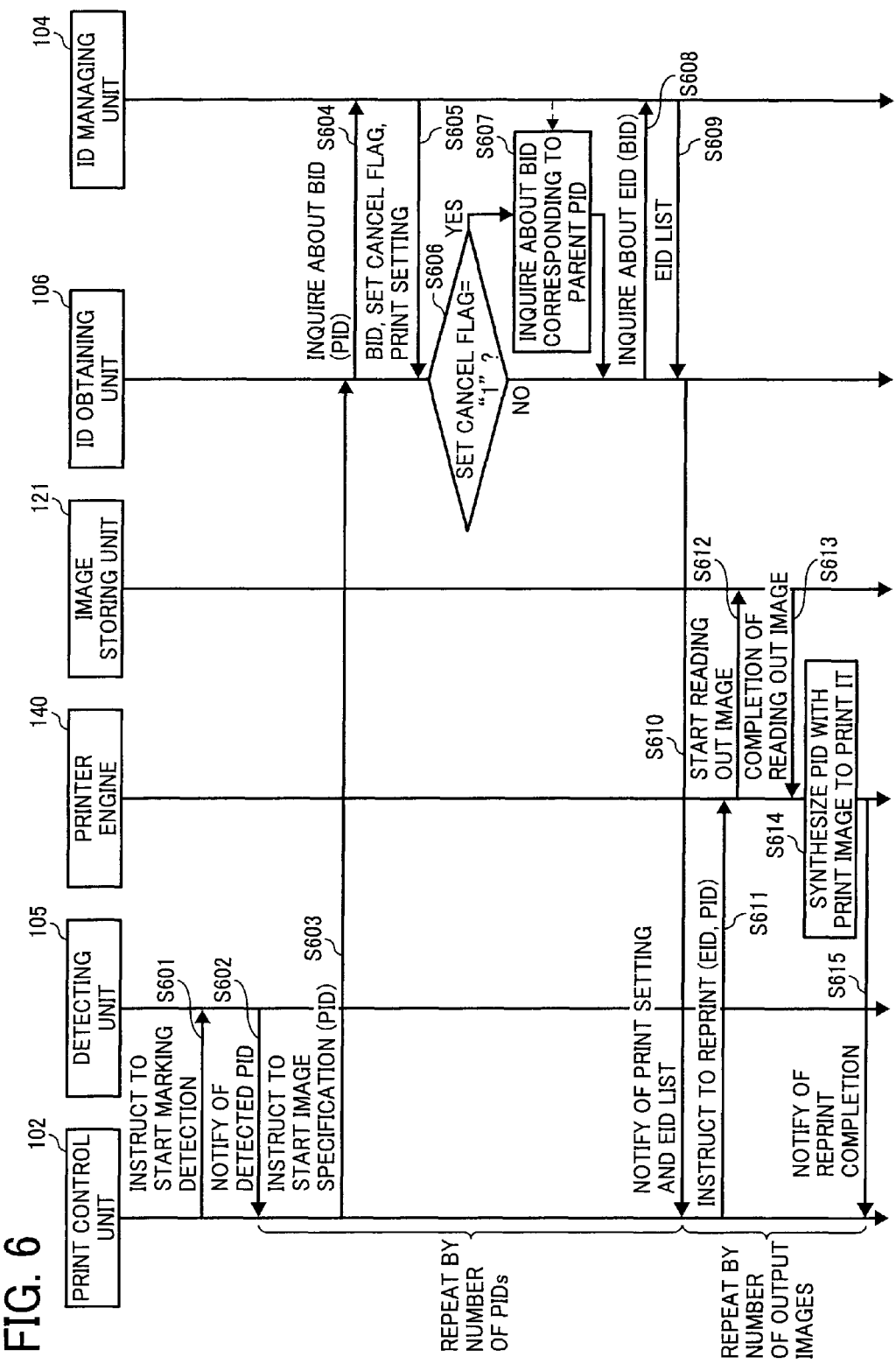
FIG. 6 is a flowchart of an entire flow of the reprinting process according to the first embodiment.

FIG. 6 is a flowchart of an entire flow of the reprinting process according to the first embodiment.

When the user designates the reprinting process via the operation panel 130 or the like, the print control unit 102 instructs the detecting unit 105 to start the marking detection (Step S601). At this time, all users have to do is to scan any one of the printing paper sheets that configure the set desired for reprinting.

The instructed detecting unit 105 detects the marking from the read-out manuscript image, and decodes the detected marking, thereby detecting the PID. The detecting unit 105 notifies the print control unit 102 of the detected PID (Step S602).

The print control unit 102 repeats an image-specifying process that specifies the image to be reprinted by the number of the detected PIDs (Steps S603 to S610). Specifically, the print control unit 102 instructs the ID obtaining unit 106 to start the image-specifying process (Step S603). This instruction includes the detected PID.

The ID obtaining unit 106, which has received the instruction, inquires to the ID managing unit 104 about the BID corresponding to the PID (Step S604). The ID managing unit 104, which has received the inquiry, obtains the BID, the set cancel flag, and the print setting corresponding to the PID from the ID storing unit to notify the ID obtaining unit 106 of them (Step S605).

The ID obtaining unit 106 determines whether the received set cancel flag is "1", in other words, whether the printing of the set, to which the PID belongs, has been canceled (Step S606). When the set cancel flag is "1" (Yes at Step S606), the ID obtaining unit 106 inquires to the ID managing unit 104 about the BID relative to the parent PID of the PID (Step S607).

Specifically, the ID obtaining unit 106 firstly inquires to the ID managing unit 104 about the parent PID corresponding to the PID. Then, the ID obtaining unit 106 further inquires to the ID managing unit 104 about the BID corresponding to the notified parent PID.

Though not shown in FIG. 6, when the ID obtaining unit 106 cannot obtain the parent PID although the set cancel flag is "1", the reprinting process is terminated, because the reprinting based on the parent PID cannot be performed. The ID obtaining unit 106 further determines whether the set cancel flag, which has been obtained relative to the parent PID, is "1". When the set cancel flag is "1", the process, which further searches the parent PID, is repeated.

When the ID obtaining unit 106 obtained the BID relative to the parent PID (Step S607), or, when the ID obtaining unit 106 determined at Step S606 that the set cancel flag is not "1" (No at Step S606), the ID obtaining unit 106 inquires to the ID managing unit 104 about all EIDs that belong to the set identified by the BID (Step S608).

The ID managing unit 104 obtains from the ID storing unit 122 all EIDs linked with the BID to notify the ID obtaining unit 106 of a list of the obtained EID (Step S609). The ID obtaining unit 106 notifies the print control unit 102 of the print setting obtained at Step S605 and the EID list notified at Step S609 (Step S610).

The print control unit 102 performs an image-reprinting process relative to the image corresponding to the obtained EID (Steps S611 to S615). Though not shown in FIG. 6, the image-reprinting process performs a generation process of the PID of the paper to be reprinted, and of the BID of the set to be reprinted similarly to the printing process.

The print setting such as designation of the number of sets can be changed also when reprinting. The ID managing unit 104 refers to the changed number of sets to generate the BID at the time of reprinting. As a result, even when the number of sets required at the time of previous printing is different from the number of sets required at the time of reprinting, the user can designate the necessary number of sets to perform printing.

Specifically, the print control unit 102 firstly instructs the printer engine 140 to perform reprinting (Step S611). This instruction includes the EID of the image to be printed and the generated PID.

The image obtaining unit 142 in the printer engine 140 then starts the process that reads out the image corresponding to the designated EID from the image storing unit 121 (Step S612). When the image obtaining unit 142 completes the read-out of the image from the image storing unit 121 (Step S613), the marking unit 141 generates the marking that has coded the PID. Then, the printer engine 140 synthesizes the generated marking with the print image to perform the printing (Step S614).

When the reprinting is completed, the printer engine 140 notifies the print control unit 102 of the reprint completion (Step S615).

A Specific example of the printing process and of the reprinting process according to the first embodiment will now be explained. FIG. 7 is an explanatory table for explaining a procedure to specify the EID of the image to be reprinted in unit of the set.

Supposing that the documents of two pages are input and a print job to output two sets of the documents is performed, the ID storing unit 122 stores therein the ID information as shown in FIG. 7. In other words, as shown in FIG. 7, relative to "JID=1" granted to the job (Step S502), two BIDs (1, 2) corresponding to the two sets, respectively, are set (Step S512).

EID 1 and 2 are granted to the two images corresponding to each page, respectively (Step S504). Because a total of four pages are printed, PIDs 1 to 4 are granted to the four pages, respectively (Step S514).

Supposing that the paper of "PID=1" is scanned, whereby the reprinting is instructed (701), "BID=1" is obtained as the BID corresponding to "PID=1" (702). In this example, because the set cancel flag is "0" (No at Step S606), all EIDs (1, 2), which belong to the set of "BID=1", are obtained (Step S609, 703).

As described above, according to the present embodiment, only a scanning of one paper sheet enables to obtain the images corresponding to all pages included in the set to which the paper belongs to perform the reprinting.

FIG. 8 is an explanatory table for explaining the procedure to specify the EID of the image to be reprinted, when the printing in unit of the set is canceled in midstream. FIG. 8 indicates that the job (JID=3), where the reprinting has been instructed by scanning the paper of "PID=5", has been canceled after the output of the first paper (PID=9) among the two paper sheets that should have been output.

In this case, supposing that the paper of "PID=9" output by the canceled job has been scanned, whereby the reprinting has been instructed (801), "BID=5" as the BID corresponding to "PID=9" is obtained. In this example, at the same time, "1" is obtained as the set cancel flag (802). Accordingly, a determination condition at Step S606 is satisfied (Yes at Step S606), and the BID corresponding to the parent PID is further searched (Step S607). In the example in FIG. 8, because the parent PID corresponding to "PID=9" is "5" (803), "BID=3" corresponding to "PID=5" is obtained (804 and 805). Then, all EIDs, which belong to the set of "BID=3", are obtained (806 and Step S609).

As described above, according to the present embodiment, even when the paper, which has been output at the time of a cancellation of the printing, it is possible to specify the adequate image to perform the reprinting.

In FIG. 7, the unit to reprint is explained as the set unit. However, the printing unit is not limited to the set unit. For example, the reprinting can be performed in unit of the job. Additionally, In FIG. 8, when the reprinting is performed by use of the paper that belongs to the canceled set, the printing of all images, which belongs to the original set, is recreated by tracking back the parent PID.

On the other hand, the image forming apparatus can also be configured so as to print only the image that has not been output due to a cancellation among the images that belong to the canceled set. A specific example on a specifying method of the EID in these cases will be described below.

FIG. 9 is an explanatory table for explaining the procedure to specify the EID of the image to be reprinted in unit of the job. FIG. 9, similarly to FIG. 7, indicates one example of the ID information when two sets of the documents of two pages are output.

Supposing that the paper of "PID=1" has been scanned, whereby the reprinting in unit of the job has been instructed (901), "JID=1" is obtained as the JID corresponding to "PID=1" (902). In this example, because the job cancel flag is "0" (No at Step S606), all EIDs (1, 2, 1, 2), which belong to the set of "JID=1", are obtained (903 and Step S609).

As described above, when the reprinting is performed in unit of the job, only a scanning of one paper sheet enables to obtain the images corresponding to all pages included in the job to which the paper belongs, and to recreate the number of sets to perform printing. In other words, the designation of the number of sets can be abbreviated.

FIG. 10 is an explanatory table for explaining the procedure to specify the EID of the image to be reprinted, when the printing in unit of the job is canceled in midstream. FIG. 10 indicates that the job (JID=3), where the reprinting in unit of the job has been instructed by scanning the paper of "PID=5", has been canceled after the output of the third paper (PID=11) among the four paper sheets that should have been output.

In this case, supposing that the paper of "PID=9" output by the canceled job has been scanned, whereby the reprinting has been instructed (1001), "JID=3" is obtained as the JID corresponding to "PID=9". In this example, at the same time, "1" is obtained as the job cancel flag (1002). Accordingly, the determination condition at Step S606 is satisfied (Yes at Step S606), and the JID corresponding to the parent PID is further searched (Step S607). In the example in FIG. 10, because the parent PID corresponding to "PID=9" is "5" (1003), "JID=2" corresponding to "PID=5" is obtained (1004 and 1005).

In FIG. 10, the EIDs (3, 4, 3) of all images, which belong to the canceled job (JID=3), are compared with the EIDs (3, 4, 3, 4) of the images, which belong to the job of the obtained "JID=2", whereby the EID (=4), which could not have been output, is specified (1006). Then, only the specified EID is reprinted.

Such processing makes it possible to restart the canceled print to reprint only the required image, using the paper output at the time of the cancellation of the printing.

As described above, in the image forming apparatus according to the first embodiment, the scanner rereads in the marking on the printing paper, whereby enabling to reprint all images in the related print unit. Accordingly, the reprinting process utilizing the marking can be efficiently performed.

When the reprinting is performed in unit of the job, the image forming apparatus can perform the reprinting by the same number of sets by referring to the information on the number of sets designated at the time of original printing. As a result, when the number of sets at the time of the previous printing is same as the number of sets at the time of the reprinting, the printing of the necessary number of sets can be recreated without any designation of the number of sets.

Even when the reprinting is performed by use of the printed paper of the job or of the set that is in an incomplete state due to a jam or the like, the group of images, which are the originals of the printed paper, can be specified. Therefore, it becomes possible to perform the normal reprinting when using any of the manuscript or the printed paper, while at the same time effectively utilizing a memory.

Regarding the job or the set in the incomplete state due to the jam or the like, because it is possible to specify a position of the canceled image and to specify the image supposed to be subsequently printed, the canceled reprinting can be restarted at an arbitrary time.

According to the method of the first embodiment, any user, who has the marked paper, can recreate the job. Therefore, there is a possibility where a user, who has obtained the paper by use of a devious means, for example, may recreate the job despite the job performer's intension, thereby leading to leakage of the information.

An image forming apparatus according to a second embodiment of the present invention manages the information on a job performer (job owner) or on the user permitted to reprint per the job, thereby managing an authority of the reprinting and enabling only the user having the authority to recreate the printing.

In the first embodiment, the identical image forming apparatus performs the marking printing and the reprinting that reads in the marking to recreate the printing of the original job. However, in the second embodiment, the image forming apparatus, which is different from the image forming apparatus that has performed the marking printing, can perform the reprinting.

Figure 11:
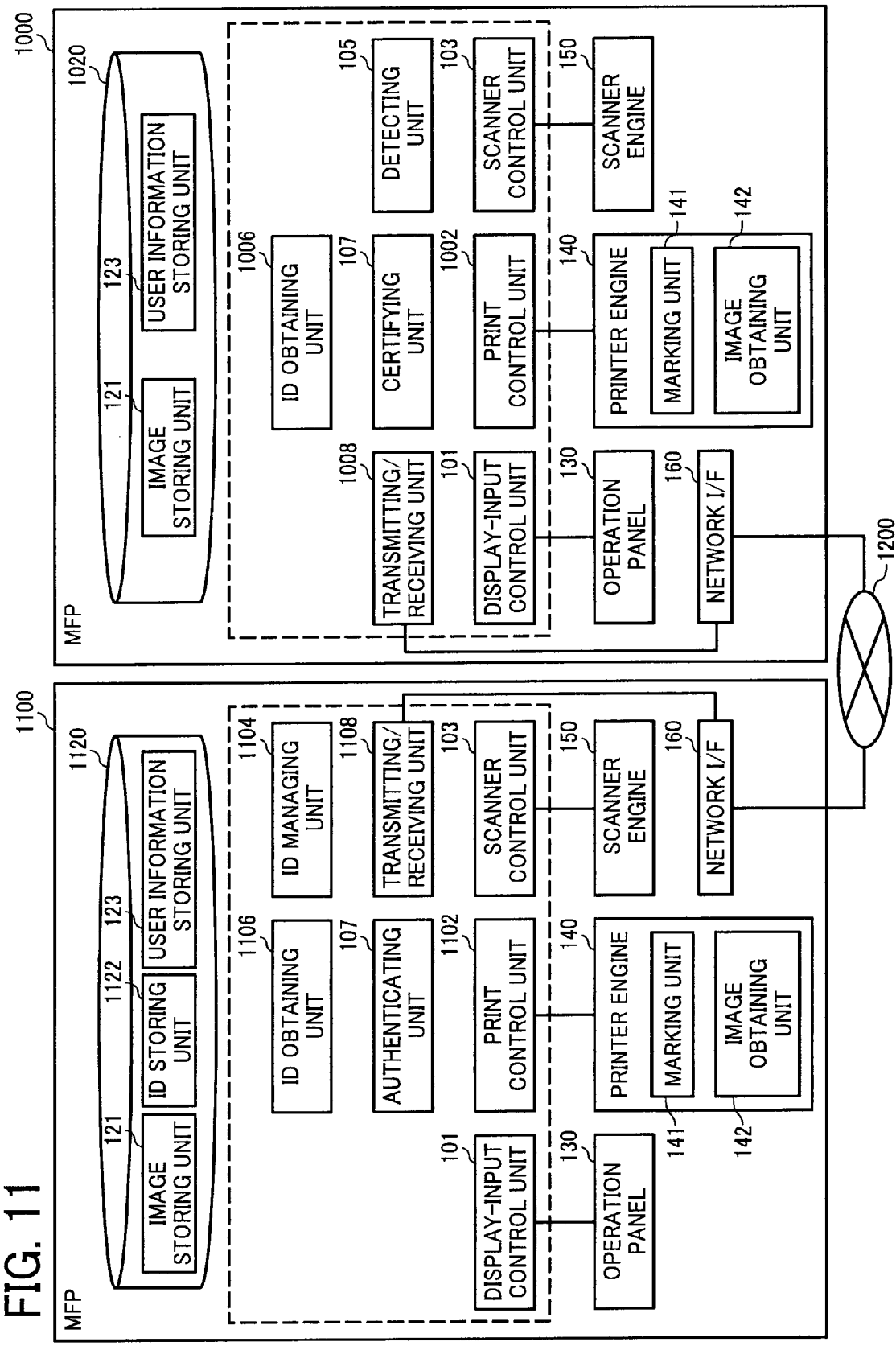
FIG. 11 is a block diagram of a configuration of an MFP that is an image forming apparatus according to a second embodiment.

FIG. 11 is a block diagram of a configuration of an MFP 1000 and of an MFP 1100 both of which are the image forming apparatuses according to the second embodiment. In FIG. 11, the image forming apparatus, which prints the marking, is referred to as the MFP 1100, the image forming apparatus, which performs the reprint, is referred to as the MFP 1000, and an example, where both apparatuses are connected with each other via a network 1200, is indicated. The number of connected image forming apparatuses is not limited to two. The image forming apparatus, which performs the print, and the image forming apparatus, which performs the reprint, may be configured in a plural manner, respectively. Or, the image forming apparatus may be configured to have both functions of the marking printing and of the reprinting.

In the second embodiment, the ID to be marked includes the information to specify the apparatus that has performed the printing, thereby enabling to track in which apparatus the image is included, or by which apparatus the paper is printed. As the information to specify the apparatus, for example, an internet protocol (IP) address of the apparatus is used.

As shown in FIG. 11, the MFP 1100 includes the image storing unit 121, an ID storing unit 1122, a user-information storing unit 123, the operation panel 130, the printer engine 140, the scanner engine 150, a network I/F 160, the display-input control unit 101, a print control unit 1102, the scanner control unit 103, an ID managing unit 1104, an ID obtaining unit 1106, an authenticating unit 107, a transmitting and receiving unit 1108.

The MFP 1100 is different from the MFP 100 according to the first embodiment in adding the user-information storing unit 123, the authenticating unit 107, the transmitting and receiving unit 1108, and the network I/F 160; in the data structure in the ID storing unit 1122; in the functions of the print control unit 1102, the ID managing unit 1104, and the ID obtaining unit 1106; and in removing the detecting unit 105. Because other configurations and functions are same as in FIG. 3 that is the block diagram of the MFP 100 according to the first embodiment, the same numeral references are attached thereto, and an explanation thereof will be omitted here.

The user-information storing unit 123 stores therein a user-information managing table that has stored the information on the user necessary for an authentication. FIG. 12 is an explanatory table of one example of the data structure of the user-information managing table. As shown in FIG. 12, the user-information managing table links and stores therein a user ID, which uniquely identifies the user, and a password.

A user-information managing server (not shown) on the network 1200 may manage the user-information managing table, and the user information may be obtained via the network 1200.

The ID storing unit 1122 is different from the ID storing unit 122 according to the first embodiment in adding to the ID information the information on the job owner or on the user (access-permitted user) permitted to reprint. FIG. 13 is an explanatory table of one example of the data structure of the ID information stored in the ID storing unit 1122 according to the second embodiment.

As shown in FIG. 13, the ID information according to the second embodiment links and stores the user ID of the job owner and of the access-permitted user in addition to the PID, the EID, the parent PID, the BID, the set cancel flag, the JID, the job cancel flag, and the print setting.

The authenticating unit 107 authenticates the user depending on whether the input user ID and the input password coincide with the user information in the user-information storing unit 123 to permit only the authenticated user to use the apparatus. In other words, when the user information, which has not been registered in the user-information managing table, is input, the authenticating unit 107 rejects the input to forbid the job from being thrown in the apparatus.

An authentication method performed by the authenticating unit 107 is not limited to the method adopting the user ID and the password. Every method that has been used, such as a biometric authentication of a fingerprint or the like, may be utilized. The user-information storing unit 123 stores therein the information necessary for the authentication method to be utilized in place of the password or the like.

The transmitting and receiving unit 1108 controls the network I/F 160 to transmit the information to an external apparatus such as the MFP 1000 or to receive the information from the external apparatus. For example, the transmitting and receiving unit 1108 receives the PID for specifying the corresponding BID or JID from the MFP 1000.

The transmitting and receiving unit 1108 transmits to the MFP 1000 the BID or the JID specified relative to the received PID. Further, the transmitting and receiving unit 1108 receives the EID for specifying the corresponding image data, or transmits the image data obtained relative to the received EID.

The network I/F 160 is a communication interface that connects with the network 1200.

The print control unit 1102 has the function to store the user information in the ID storing unit 1122 by use of the ID managing unit 1104 in addition to the print control unit 102 according to the first embodiment.

The ID managing unit 1104 has a managing function of an access authority at the time of a printing recreation, a storing function of the user information, and a changing function of the stored user information in addition to the function of the ID managing unit 104 according to the first embodiment. FIG. 14 is a block diagram of a detailed configuration of the ID managing unit 1104 according to the second embodiment.

As shown in FIG. 14, the ID managing unit 1104 includes a storing unit 1104a and a changing unit 1104b. The storing unit 1104a follows the instruction from the print control unit 1102 to store the user ID of the job owner or the user ID of the user permitted to perform the reprinting designated before performing the job.

The changing unit 1104b changes the access-permitted user stored in the ID storing unit 1122.

The ID obtaining unit 1106 obtains from the ID storing unit 1122 the EID and the print setting corresponding to the PID that the transmitting and receiving unit 1108 has received.

Referring back to FIG. 11, the MFP 1000, which is the image forming apparatus that instructs to reprint, includes the image storing unit 121, the user-information storing unit 123, the operation panel 130, the printer engine 140, the scanner engine 150, the network I/F 160, the display-input control unit 101, a print control unit 1002, the scanner control unit 103, an ID obtaining unit 1006, the authenticating unit 107, and a transmitting and receiving unit 1008.

The MFP 1000 is different from the MFP 100 according to the first embodiment in adding the user-information storing unit 123, the authenticating unit 107, the transmitting and receiving unit 1008, and the network I/F 160; in the functions of the print control unit 1002 and of the ID obtaining unit 1006; and in removing the ID storing unit 1122 and the ID managing unit 104. Because other configurations and functions are same as in FIG. 3 that is the block diagram of the MFP 100 according to the first embodiment, the same numeral references are attached thereto, and an explanation thereof will be omitted here.

Because the user-information storing unit 123, the authenticating unit 107, and the network I/F 160 are same as those of the MFP 1100, the same numeral references are attached thereto, and an explanation thereof will be omitted here.

The transmitting and receiving unit 1008 transmits the information to the external apparatus such as the MFP 1100, or receives the information from the external apparatus. For example, the transmitting and receiving unit 1008 transmits to the MFP 1100 the PID for requesting a search of the corresponding EID. The transmitting and receiving unit 1008 receives from the MFP 1100 the EID or the print setting corresponding to the transmitted PID. Further, the transmitting and receiving unit 1008 transmits to the MFP 1100 the received EID to specify the image data, and receives from the MFP 1100 the image data sent back relative to the transmitted EID.

The print control unit 1002 has the function to request a transfer of the image data, which will become a target of the reprinting, to the MFP 1100 before reprinting the image to control the processing to store the image data in the image storing unit 121 in the apparatus thereof, in addition to the function of the print control unit 102 according to the first embodiment.

The ID obtaining unit 1006 obtains from the ID storing unit 1122 in the MFP 1100 via the transmitting and receiving unit 1008 the EIDs of all images included in the print unit to where the PID, which the detecting unit 105 has detected, belongs, and the print setting corresponding to the print unit.

The image information is transmitted by use of the following transmission path. The image, which is input by the scanner or the network I/F, is transmitted to the image storing unit 121 in response to the instruction from the print control unit 1102. The image, which has been accumulated in the image storing unit 121, is transmitted to the printer engine 140 in response to the instruction from the print control unit 1102, and then, the printing is performed. Further, when the external apparatus requests the image transfer, the transmitting and receiving unit 1008 transmits the image to the external apparatus via the network I/F 160.

In the MFP 1000 side that has received the image transfer, the image, which the transmitting and receiving unit 1008 has received, is transmitted to the image storing unit 121. The image, which has been accumulated in the image storing unit 121, is transmitted to the printer engine 140 in response to the instruction from the print control unit 1002, and then, the printing is performed.

Figure 15B:
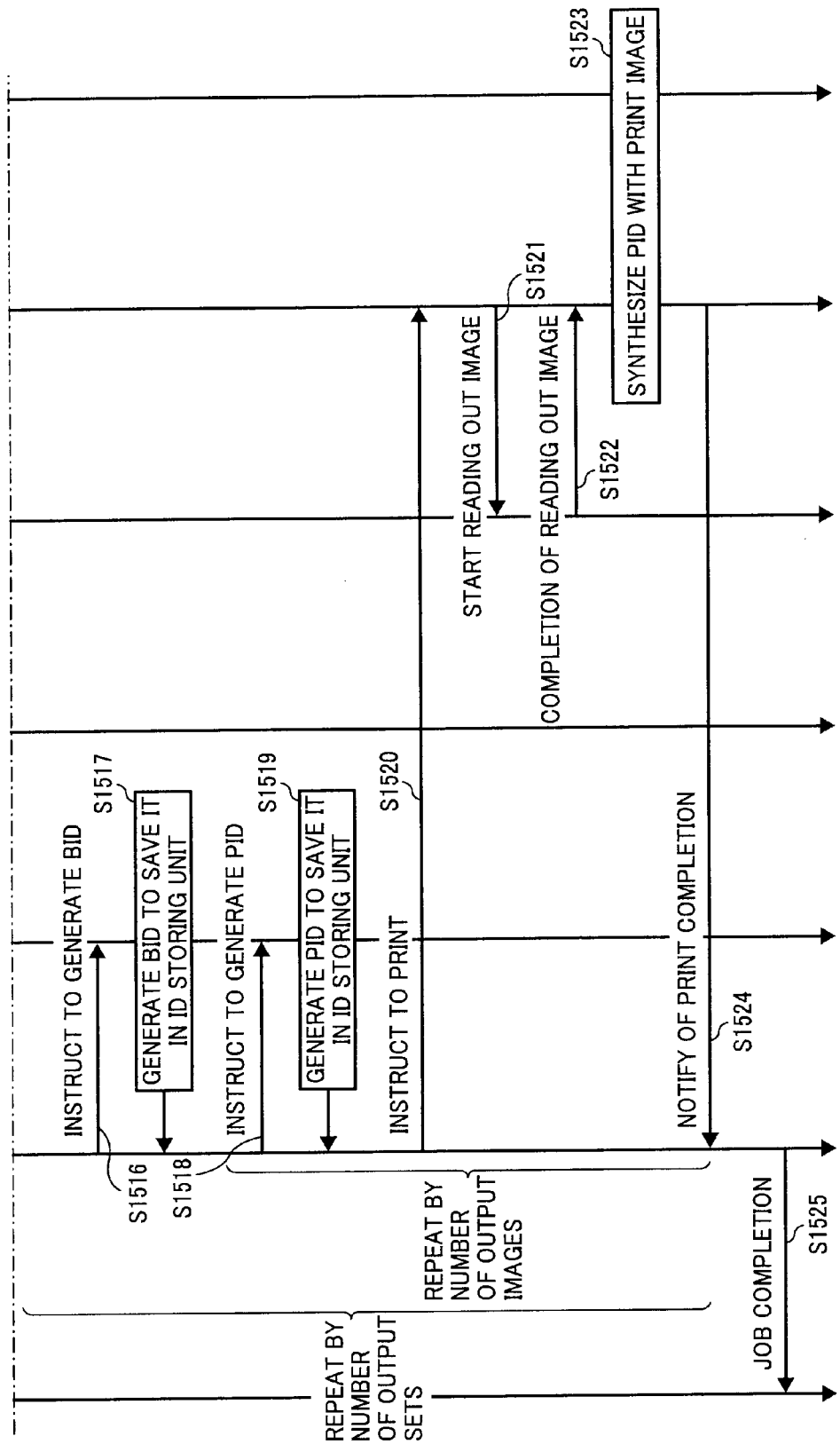
FIG. 15 is a flowchart of an entire flow of a printing process according to the second embodiment.

The printing process by use of the MFP 1100 according to the second embodiment configured in this manner will now be explained. FIG. 15 is a flowchart of an entire flow of the printing process according to the second embodiment.

When the user inputs the user ID and the password from a login display of the operation panel 130 (Step S1501), the authenticating unit 107 performs an authentication processing to notify the authenticated result (Step S1502).

Figure 16:
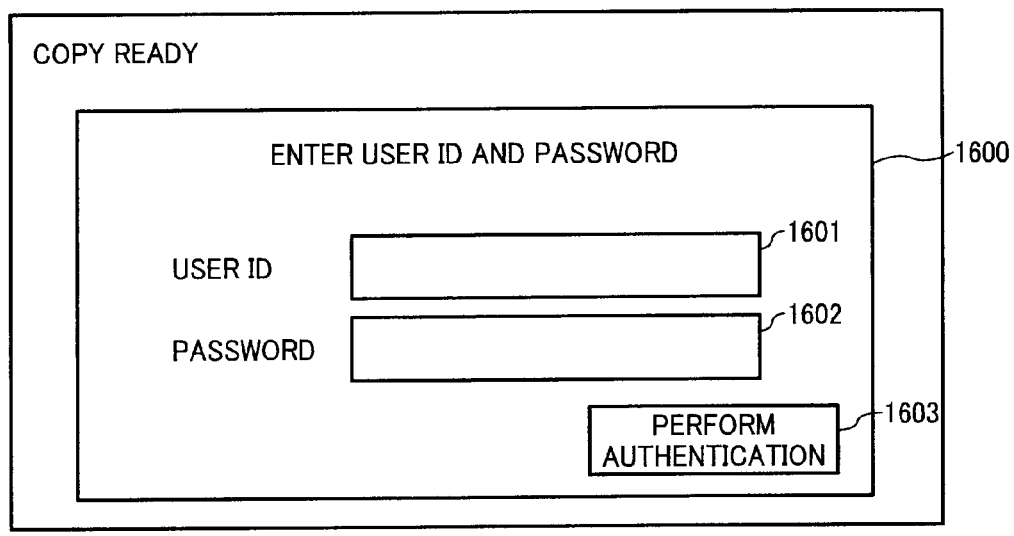
FIG. 16 is an explanatory view of one example of a configuration of a login display.

FIG. 16 is an explanatory view of one example of a configuration of the login display. As shown in FIG. 16, a login display 1600 displays a user-ID input field 1601 for inputting a user ID, a password input field 162 for inputting a password, and a authentication performing button 1603 for performing the authentication.

When the authenticating unit 107 duly authenticated the user ID and the password, the display-input control unit 101 receives from the operation panel 130 the designation of the access-permitted user by use of a setting display (not shown) or the like for designating the user permitted to reprint (Step S1503). For example, the display-input control unit 101 displays in a selectable manner the user ID of the users stored in the user-information managing table to receive the selected user as the access-permitted user. Only the job owner can designate the access-permitted user.

Then, the print control unit 1102 stores information of the job owner, who is the authenticated user, and the designated access-permitted user in the ID storing unit 1122 by use of the ID managing unit 1104 (Step S1504).

This process allows performing the control to permit only the job owner or the access-permitted user to perform the reprinting by referring to the ID storing unit 1122.

An ID generation processing, the image-accumulation processing, an accumulated-image printing process from Step S1505 to Step S1525 are the same processing as from Step S501 to Step S521 in the MFP 100 according to the first embodiment. Therefore, an explanation thereof will be omitted.

The reprinting process by use of the MFP 1000 according to the second embodiment will now be explained. FIG. 17 is a flowchart of an entire flow of the reprinting process according to the second embodiment.

A marking detection processing and an image-specification start designation processing from Step S1701 to Step S1703 are the same processing as from Step S601 to Step S603 in the MFP 100 according to the first embodiment. Therefore, an explanation thereof will be omitted.

After the print control unit 1002 has instructed to start the image-specifying process (Step S1703), the ID obtaining unit 1006 inquires about the BID corresponding to the detected PID to the ID managing unit 1104 in the MFP 1100 via the transmitting and receiving unit 1008 in the MFP 1000 and the transmitting and receiving unit 1108 in the MFP 1100 (Step S1704). This inquiry includes the user ID of the user who has logged-in and instructed to reprint. The information to specify the device, such as the IP address included in the detected marking, determines the inquiry-destination apparatus.

The ID managing unit 1104, which has received the inquiry, obtains from the ID storing unit 1122 the user ID of the job owner and of the access-permitted user in addition to the BID, the set cancel flag, and the print setting corresponding to the PID. The ID managing unit 1104 compares the user ID, which has been inquired about, with the obtained user ID, thereby determines whether the user, who has instructed to reprint, has the access authority relative to the corresponding job (Step S1705).

The ID managing unit 1104 notifies the ID obtaining unit 1006 of a determination result of the access authority, the BID, the set cancel flag, and the print setting via the transmitting and receiving unit 1108 and the transmitting and receiving unit 1008 (Step S1706).

A set-cancel-flag determination processing and an EID inquiry-notification processing from Step S1707 to Step S1711 are the same processings as from the Step S606 to Step S610. Therefore, an explanation thereof will be omitted.

The print control unit 1002 performs an image transfer-store processing to transfer the image to be reprinted from the MFP 1100 to store the image in the image storing unit 121 (Steps S1712 to S1717).

Specifically, the print control unit 1002 instructs the image storing unit 121 to start the image accumulation (Step S1712). Then, the print control unit 1002 notifies the image storing unit 121 in the MFP 1100 of a request of the image transfer (Step S1713).

The image storing unit 121 in the MFP 1100, which has received the transfer request, starts the transfer of the image (Step S1714). When the transfer completes (Step S1715), the image storing unit 121 notifies the print control unit 1002 in the MFP 1000 of the completion of the transfer (Step S1716). The print control unit 1002 notifies the image storing unit 121 of the completion of the image accumulation (Step S1717).

After the image data to be reprinted have been obtained from the MFP 1100 to be stored in the image storing unit 121 in the MFP 1000, the image reprinting process relative to the stored image data is performed.

The image reprinting process from Step S1718 to Step S1722 is the same processing as from Step S611 to Step S615 in the MFP 100 according to the first embodiment. Therefore, an explanation thereof will be omitted.

When the reprint job is performed, the ID managing unit 1104 does not store in the ID storing unit 1122 the user ID of the user, who has performed the reprint as the job owner, but duplicates the job owner of the original job, which is the reprint target, to set the duplication as the job owner of the reprint job.

Similarly, the ID managing unit 1104 duplicates the access-permitted user that the job of the reprint target has managed to record the duplication in the ID storing unit 1122. As a result, the job owner of the reprint job does not become the user authenticated at the time of the reprinting, but becomes the user who has performed the job targeted for the recreation. In other words, because the access authority of the original job at the time of the reprinting can be taken over, it is possible to prevent the access authority from being changed despite the job performer's intension.

On the other hand, when the user capable of recreating is changed, only the job owner can change the user. FIG. 18 is an explanatory view of one example of a change-job selection display that is shown when the access-permitted user is changed.

As shown in FIG. 18, a change-job selection display 1800 displays thereon a display field 1081 that displays a list of changeable jobs, a Next button 1802 for displaying the job on the next screen, and a Previous button 1803 for displaying the previous job on the previous screen. The display field 1801 displays thereon the JID, the print condition (print setting) of the job, a document name, and the IP address of the apparatus that has performed the job.

The display field 1801 displays thereon only the job having the job owner that coincides with the user ID of the logged-in user. This process makes it possible for only the job owner, who has performed the print, to change the access authority.

When the job is selected in the change-job selection display 1800, a change display, which changes the access-permitted user of the selected job, is displayed. FIG. 19 is an explanatory view of one example of the change display.

As shown in FIG. 19, a change display 1900 includes an access-permitted-user display field 1901 that displays thereon the current access-permitted user, a selection-user display field 1902 that selects the user to be added, a delete button 1903, an add button 1904, a Change button 1905, and a Cancel button 1906.

The user is selected in the access-permitted-user display field 1901, and then, the delete button 1903 is pressed, whereby the access-permitted user can be deleted. The user is selected in the selection-user display field 1902, and then, the add button 1904 is pressed, whereby the access-permitted user can be added. When the change button 1905 is pressed after the deletion or the addition of the user, the changed content is stored in the ID storing unit 1122.

As the method to change the access authority, the image forming apparatus may be configured so as to employ the method or the like to obtain the information to be changed via the network 1200 other than the method to change the access authority through the operation on the various displays displayed on the operation panel 130.

As explained above, the second embodiment determines whether the reprinting is performed in consideration of the access authority of the job corresponding to the detected PID. Therefore, when a plurality of PIDs are detected from a plurality of markings by, for example, scanning a plurality of paper sheets, the access authorities may not present in the jobs corresponding to other PID although the access authorities are present in the jobs corresponding to a certain PID.

In this case, the image forming apparatus may be configured to reprint only the job where the access authority is present, and may be configured to permit the reprint only when the access authorities are present in all jobs. The former case has an advantage where the reprinting can be performed regardless of whether there is the access authority. The latter case has a convenience where the user can prevent a half-finished recreation of the job, which is unintended by the user.

The image forming apparatus may be configured so as to set in advance such processing at the time of detecting the marks by use of an initial setting display (not shown) that preliminary sets a motion of the apparatus.

Also in the second embodiment, the canceled job can be recreated in a similar manner to the first embodiment. In this case, only when having the access authority, the canceled job is permitted to be recreated. The image forming apparatus may be configured in such a manner that when the job is interrupted due to the jam or the cancel, the recreation is not allowed even for the access-permitted user, and only the job owner can recreate the job. The reason is that the interrupted job is the job that should be broken off under ordinary circumstances, and it may be desirable to tighten the authority for the recreation.

As described above, in the image forming apparatus according to the second embodiment, it is possible to set the access authority, and is possible only for the user having the access authority to perform the reprinting. This configuration makes it possible to prevent the leakage of the information, which is against the job owner's intension. In the image forming apparatus according to the second embodiment, the reprinting can be performed from the apparatus other than the apparatus where the image has been accumulated.

MODIFIED EXAMPLE

The present invention shall not be limited to the respective embodiments, and is capable of being applied to a modified example like an exemplification discussed below.

In the embodiment, the case has been explained where the information to specify the apparatus included in the marking is the IP address. However, the IP address is not necessarily attached to equipment, and there is also a case where a different IP address is allocated every time the equipment is connected with the network. Therefore, in the present modified example, an example will be explained that makes it possible to specify the MFP that has performed the printing even when the IP address is changed. The MFP according to the present modified example shall be the example that includes an equipment ID that specifies the MFP when the printing process is performed. The equipment ID shall have been uniquely allocated per the MFP in advance.

To specify the IP address by use of the equipment ID detected from the marking, the MFP links the equipment ID thereof, the IP address allocated thereto, and a port number that performs the processing explained in the embodiments to request a registration to the equipment such as a domain name system (DNS) server. As a result, the DNS server links and retains the equipment ID, the IP address, and the port number.

In the present modified example, the registration processing shall be performed to the DNS server after the power of the MFP has been turned on and the IP address has been allocated to the MFP.

As a registration destination of the information, the various equipments are thinkable, such as the DNS server or the MFP in a same subnetwork as the MFP that has requested the registration.

When the equipment such as the DNS server receives the request for the registration of the information from the MFP, the equipment retains the information in a service resource (SRV) record or an A record or the like. For example, the equipment stores the equipment ID in a "Name" field in the SRV record; stores the port number in a "Port" field; stores the equipment ID in the "Name" field in the A record; and stores the IP address in an "address (Addr)" field, thereby being capable of retaining a correspondence relationship between the equipment ID and the port number. Further, when using a "text (TXT)" record, the equipment can store also the condition or the like at the time of performing the reprinting.

As a transmission method at the time of registration, a unicast transmission or a multicast transmission may be used. When the multicast transmission is performed, it is possible to register the correspondence relationship between the equipment ID, the IP address, and the port number to all MFPs included in the same subnetwork and the DNS server or the like. When the unicast transmission is performed, it is possible to register the correspondence relationship to the DNS server or the like beyond the same network. In other words, when the unicast transmission is performed to register the correspondence relationship, it is possible to specify the MFP from the network outside the same subnetwork. This system makes it possible to register the information to, for example, the representative DNS server in the network at a business office.

When the user scans manuscript paper by use of an arbitrary MFP, the MFP detects the equipment ID and the PID. Then, the MFP inquires about the IP address or the like to the other equipments (e.g., the DNS server or other MFPs in the network) by use of a search query including the equipment ID. This inquiry may use the unicast transmission or the multicast transmission.

When the unicast transmission is performed, the user may be made to select the business office where the manuscript paper has been printed at the time of specifying a transmission destination. This system makes it possible for the MFP, which has performed the scanning, to perform the unicast transmission of the inquiry by use of the search query to the DNS server representative of the business office selected by the user.

When retaining the correspondence relationship, the DNS server or the MFP, which has received the inquiry, transmits the IP address and the port number both of which are linked with the equipment ID to the MFP that has scanned the manuscript paper.

This process makes it possible for the MFP, which has scanned the manuscript paper, to specify the IP address and the port number of the MFP that has stored manuscript data for the reprinting. The subsequent reprinting process can be actualized by performing the same processing procedures as the embodiments.

In the present modified example, the MFP performs the processing, whereby enabling to specify the MFP that has stored therein the image data for the reprint and the port number that provides the function for the reprint even when the IP address is changed. When the registration is performed by use of the unicast transmission, even if the registration is performed from the network different from the MFP that has performed the reprinting, it is possible to specify the MFP and the port number.

Figure 20:
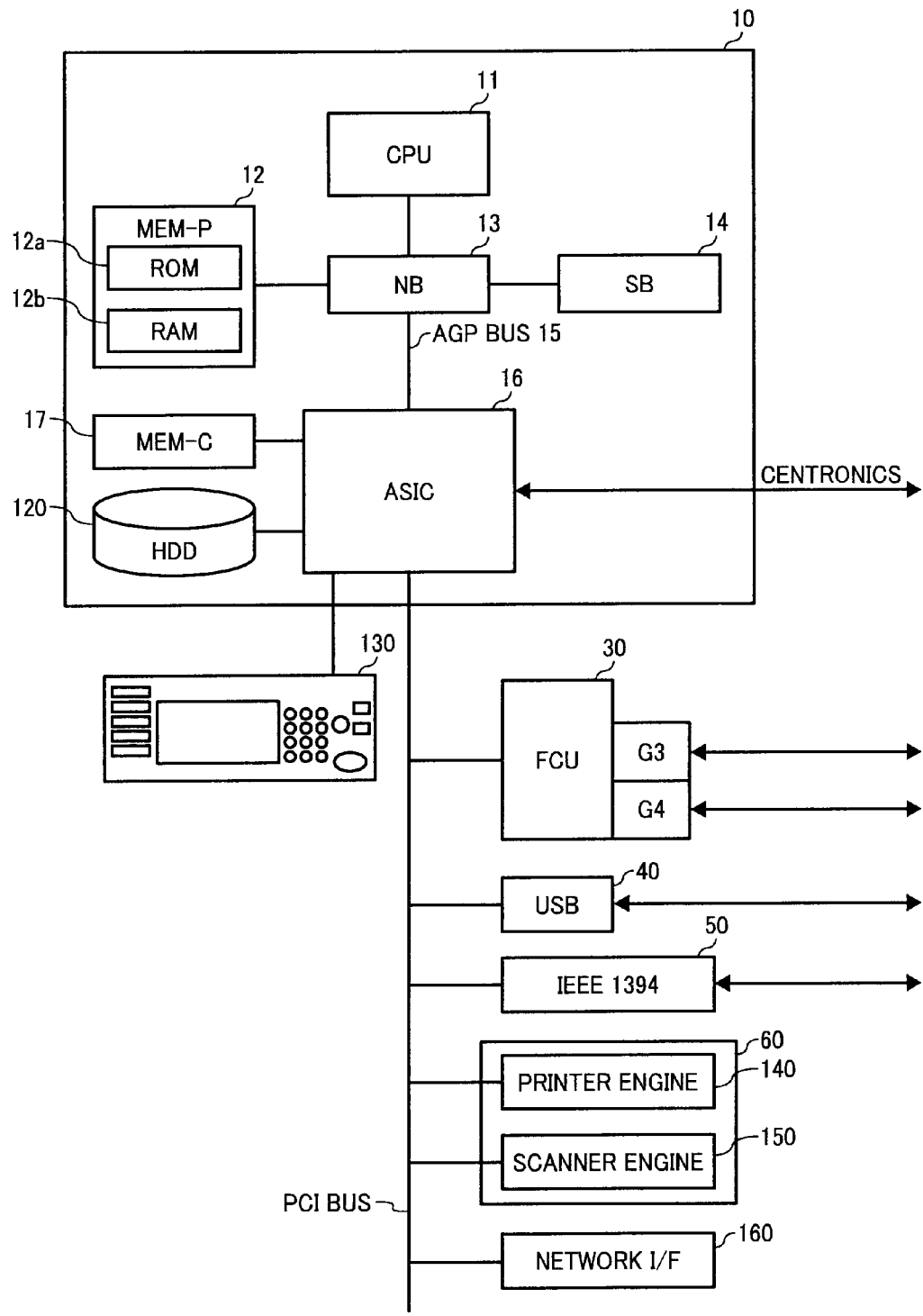
FIG. 20 is a block diagram of a hardware configuration of the image forming apparatus according to each of the first and the second embodiments.

FIG. 20 is a block diagram of a hardware configuration of the image forming apparatus (the MFPs 100, 1000, and 1100). As shown in FIG. 20, the MFP is configured so as to connect a controller 10 with an engine unit 60 by a peripheral component interconnect (PCI) bus. The controller 10 is a controller that controls an entire control of the MFP, a drawing, a communication, and an input from an operating unit that is not shown. The engine unit 60 includes the printer engine 140 that can be connected with the PCI bus, or the scanner engine 150. The printer engine 140 is, for example, a monochrome plotter, a one-drum color plotter, a four-drum color plotter, the scanner, or a fax unit. The engine unit 60 includes an image processing section such as an error diffusion or a gamma conversion in addition to an engine section such as a plotter.

The controller 10 is configured so as to have a central processing unit (CPU) 11, a system memory (MEM-P) 12, a north bridge (NB) 13, a south bridge (SB) 14, an application specific integrated circuit (ASIC) 16, a local memory (MEM-C) 17, and the HDD 120, and to connect the NB 13 with the ASIC 16 by an accelerated graphics port (AGP) bus 15. The MEM-P 12 further has a read only memory (ROM) 12a and a RAM 12b.

The CPU 11 executes the entire control of the MFP, and has a chip set that includes the NB 13, the MEM-P 12, and the SB 14. The CPU 11 is connected with other equipments via the chip set.

The NB 13 is a bridge for connecting therewith the CPU 11, the MEM-P 12, the SB 14, and the AGP bus 15. The NB 13 has a memory controller that controls read and write or the like relative to the MEM-P 12, a PCI master, and an AGP target.

The MEM-P 12 is a system memory that is used as the memory for storing therein a program or data, the memory for developing the program and the data, the memory for the drawing of a printer or the like, and is made up of the ROM 12a and the RAM 12b. The ROM 12a is the memory only for reading, which is used as the memory for storing the program or the data. The RAM 12b is the memory capable of reading and writing, which is used as the memory for developing the program or the data, the memory for the drawing of the printer or the like.

The SB 14 is the bridge for connecting therewith the NB 13, a PCI device, and a peripheral device. The SB 14 is connected with the NB 13 via the PCI bus. The network I/F 160 or the like is also connected with the PCI bus.

The ASIC 16 is an integrated circuit (IC) for a usage of the image processing, which has a hardware element for the image processing, and has the function of the bridge to connect therewith the AGP bus 15, the PCI bus, the HDD 120, and the MEM-C 17, respectively. The ASIC 16 includes the PCI target and the AGP master, an arbiter (hereinafter, "ARB") that is a core of the ASIC 16, the memory controller that controls the MEM-C 17, a plurality of direct memory access controllers (DMAC) that perform a rotation of the image data or the like by use of a hardware logic or the like, and a PCI unit that performs a data transfer with the engine unit 60 via the PCI bus. A fax control unit (FCU) 30, a universal serial bus (USB) 40, an IEEE 1394 interface 50 are connected with the ASIC 16 via the PCI bus.

The MEM-C 17 is a local memory that is used as an image buffer for a copy, and as a code buffer. The HDD 120 is a storage for performing the accumulation of the image data, of the program, of font data, and of a form.

The AGP bus 15 is a bus interface for a graphics accelerator card, which has been proposed to speed up a graphic processing. The AGP bus 15 directly accesses the MEM-P 12 with a high throughput, thereby speeding up the graphics accelerator card.

An image forming program, which is executed in the image forming apparatus according to each of the first and the second embodiments, has been incorporated in the ROM or the like in advance to be provided.

The image forming program, which is executed in the image forming apparatus according to each of the first and the second embodiments, may be configured to be recorded by use of a file having an installable form or an executable form in a recording medium such as a compact disk read only memory (CD-ROM), a flexible disk (FD), a compact disk recordable (CD-R), or a digital versatile disk (DVD) that a computer can read to be provided.

Further, the image forming program, which is executed in the image forming apparatus according to each of the first and the second embodiments, may be configured to be stored in the computer connected with the network such as the Internet, and then, to be downloaded via the network, thereby being provided. In addition, the image forming program, which is executed in the image forming apparatus according to each of the first and the second embodiments, may be configured to be provided or distributed via the network such as the Internet.

The image forming program, which is executed in the image forming apparatus according to each of the first and the second embodiments, is modularly configured to include the respective units (the display-input control unit, the print control unit, the scanner control unit, the ID control unit, the detecting unit, the ID obtaining unit or the like), and is configured in such a manner that as the actual hardware, the CPU (processor) reads out the image forming program from the ROM to execute the program, whereby the respective units are loaded on a main storage device, and then, the respective units are generated on the main storage device.

The present invention brings about an effect where it is possible to efficiently perform the reprinting process utilizing the marking, because the present invention can specify all images included in the print unit to which the paper belongs from arbitrary paper where the marking printing has been performed.

In addition, the present invention brings about an effect where it is possible to prevent the leakage of the information, which is against the job owner's intension, because only the job owner, who has performed the job, or the user, whom the job owner has permitted, can recreate the job.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an image storing unit that stores therein an input image and an image identification for identifying the image, in association with each other;
    an identification storing unit that stores therein identification information in which a unit identification for identifying a print unit formed with at least one image, the image identification of the image included in the print unit, a medium identification for identifying a recording medium on which the image is printed, a print condition for the print unit, and user identification that includes a print user identification and a permitted-user identification, which corresponds to a user permitted by the print user to perform a function associated with the image, are associated with each other, the print user identification and the permitted-user identification corresponding to different users;
    a scanner unit that reads a code image in which the medium identification is coded from the recording medium;
    a detecting unit that detects the medium identification from the code image read by the scanner unit;
    an identification obtaining unit that obtains the image identification of all images included in the print unit that is identified by the unit identification corresponding to the medium identification detected by the detecting unit and the print condition corresponding to the medium identification, from the identification storing unit;
    an image obtaining unit that obtains all images corresponding to the image identification obtained by the identification obtaining unit from the image storing unit; and
    a printing unit that prints the image obtained by the image obtaining unit under the print condition obtained by the identification obtaining unit.

2. The image forming apparatus according to claim 1, wherein
    the identification storing unit stores therein the identification information in which a set identification for identifying a set unit, an image identification of an image included in the set unit, a medium identification of a recording medium on which the image is printed, and a print condition for the set unit are associated with each other, and
    the identification obtaining unit obtains the image identification of an image included in the set unit that is identified by the set identification corresponding to the medium identification detected by the detecting unit and the print condition corresponding to the medium identification, from the identification storing unit.

3. The image forming apparatus according to claim 1, wherein
    the identification storing unit stores therein the identification information in which a job identification for identifying a job unit, an image identification of an image included in the job unit, a medium identification of a recording medium on which the image is printed, and a print condition for the job unit are associated with each other, and
    the identification obtaining unit obtains the image identification of an image included in the job unit that is identified by the job identification corresponding to the medium identification detected by the detecting unit and the print condition corresponding to the detected medium identification, from the identification storing unit.

4. The image forming apparatus according to claim 1, wherein
    the identification storing unit stores therein the identification information in which a parent identification indicating the medium identification detected by the detecting unit when printing the image included in the print unit and cancel information indicating whether printing of the print unit is canceled are further associated, and
    the identification obtaining unit obtains, when the cancel information corresponding to the medium identification indicates a print cancel, the parent identification corresponding to the medium identification, the medium identification that coincides with the parent identification, the image identification of the image included in the print unit that is identified by the unit identification corresponding to the medium identification, and the print condition corresponding to the medium identification, from the identification storing unit.

5. The image forming apparatus according to claim 1, wherein
    the identification storing unit stores therein the identification information in which a parent identification indicating the medium identification detected by the detecting unit when printing the image included in the print unit and cancel information indicating whether printing of the print unit is canceled are further associated with each other, and
    the identification obtaining unit obtains, when the cancel information corresponding to the detected medium identification indicates a print cancel, the parent identification corresponding to the medium identification, the medium identification that coincides with the parent identification, the image identification that does not coincide with the image identification of the image included in the print unit that is identified by the unit identification corresponding to the medium identification from among the image identification of the images included in the print unit that is identified by the unit identification corresponding to the medium identification, and the print condition corresponding to the medium identification, from the identification storing unit.

6. The image forming apparatus according to claim 1, further comprising an authenticating unit that authenticates a user with the user identification, wherein
    the identification storing unit stores therein the identification information in which the print user identification that is the user identification of the user printing the image in the print unit is further associated, and the identification obtaining unit determines whether the user identification of the authenticated user coincides with the print user identification corresponding to the medium identification, and when the user identification coincides with the print user identification, obtains the image identification of the image included in the print unit that is identified by the unit identification corresponding to the medium identification and the print condition corresponding to the medium identification, from the identification storing unit.

7. The image forming apparatus according to claim 1, further comprising an authenticating unit that authenticates a user with the user identification, wherein the identification storing unit stores therein the identification information in which the permitted-user identification that is the user identification of the user permitted to reprint the printed image is further associated, and the identification obtaining unit determines whether the user identification of the authenticated user coincides with the permitted-user identification corresponding to the medium identification, and when the user identification coincides with the permitted-user identification, obtains the image identification of the image included in the print unit that is identified by the unit identification corresponding to the medium identification and the print condition corresponding to the medium identification, from the identification storing unit.

8. The image forming apparatus according to claim 7, further comprising a storing unit that receives, upon the input image being printed, the user identification of the user permitted to reprint the image, and stores in the identification storing unit the identification information in which the user identification is associated with the image identification of the image as the permitted-user identification.

9. The image forming apparatus according to claim 8, wherein, upon the printing unit printing the image, the storing unit obtains the permitted-user identification corresponding to the medium identification from the identification storing unit, and stores in the identification storing unit the identification information in which the permitted-user identification is associated with the image identification of the image.

10. The image forming apparatus according to claim 7, further comprising a changing unit that changes the permitted-user identification stored in the identification storing unit.

11. The image forming apparatus according to claim 10, wherein the identification storing unit stores therein the identification information in which the print user identification that is the user identification of the user printing the image is further associated, and the changing unit determines whether the user identification of the authenticated user coincides with the print user identification corresponding to the permitted-user identification to be changed, and when the user identification coincides with the print user identification, changes the permitted-user identification.

12. The image forming apparatus according to claim 7, wherein when the medium identification includes a medium identification associated with the permitted-user identification that coincides with the user identification of the authenticated user and a medium identification associated with the permitted-user identification that does not coincide with the user identification of the authenticated user, the identification obtaining unit obtains the image identification of the image included in the print unit that is identified by the unit identification corresponding to the medium identification and the print condition corresponding to the medium identification from the identification storing unit, for the medium identification associated with the permitted-user identification that coincides with the user identification of the authenticated user.

13. The image forming apparatus according to claim 7, wherein the identification obtaining unit determines whether the permitted-user identification associated with all medium identifications detected by the detecting unit coincides with the user identification of the authenticated user, and when the permitted-user identification coincides with the user identification, obtains the image identification of the image included in the print unit that is identified by the unit identification corresponding to the medium identification and the print condition corresponding to the medium identification, from the identification storing unit.

14. The image forming apparatus according to claim 7, wherein the identification storing unit stores therein the identification information in which the print user identification that is the user identification of the user printing the image, a parent identification indicating the medium identification detected by the detecting unit when the image included in the print unit is printed, and a cancel information indicating whether printing of the print unit is canceled are further associated, and when the cancel information corresponding to the detected medium identification indicates a print cancel, the identification obtaining unit determines whether the user identification of the authenticated user coincides with the print user identification corresponding to the medium identification, and when the user identification coincides with the print user identification, obtains the parent identification corresponding to the medium identification, the medium identification that coincides with the parent identification, the image identification of the image included in the print unit that is identified by the unit identification corresponding to the medium identification, and the print condition corresponding to the medium identification, from the identification storing unit.

15. The image forming apparatus according to claim 1, wherein the permitted-user identification corresponds to a plurality of different users permitted by the print user to perform functions associated with the image.

16. An image forming system comprising:

a first image forming apparatus that stores therein a printed image; and a second image forming apparatus that is connected to the first image forming apparatus with a network and that prints an image, wherein the first image forming apparatus includes an image storing unit that stores therein an input image and an image identification for identifying the image, in association with each other, an identification storing unit that stores therein identification information in which a unit identification for identifying a print unit formed with at least one image, the image identification of the image included in the print unit, a medium identification for identifying a recording medium on which the image is printed, a print condition for the print unit, and user identification that includes a print user identification and a permitted-user identification, which corresponds to a user permitted by the print user to perform a function associated with the image, are associated with each other, the print user identification and the permitted-user identification corresponding to different users, a first receiving unit that receives the medium identification from the second image forming apparatus, a first identification obtaining unit that obtains the image identification of all images included in the print unit that is identified by the unit identification corresponding to the medium identification and the print condition corresponding to the medium identification, from the identification storing unit, a first transmitting unit that transmits the image identification and the print condition to the second image forming apparatus, a second receiving unit that receives the image identification from the second image forming apparatus, and a second transmitting unit that obtains all images corresponding to the image identification from the image storing unit, and transmits the image to the second image forming apparatus, and the second image forming apparatus includes a scanner unit that reads a code image in which the medium identification is coded from the recording medium, a detecting unit that detects the medium identification from the code image read by the scanner unit, a second identification obtaining unit that transmits the medium identification to the first image forming apparatus, receives the image identification and the print condition corresponding to the transmitted medium identification from the first image forming apparatus, and obtains the image identification of all images included in the print unit that is identified by the unit identification corresponding to the medium identification and the print condition corresponding to the medium identification, a third transmitting unit that transmits the image identification to the first image forming apparatus, a third receiving unit that receives the image corresponding to the image identification from the first image forming apparatus, and a printing unit that prints the image under the print condition.

17. An image forming method for an image forming apparatus that includes an image storing unit that stores therein an input image and an image identification for identifying the image, in association with each other and an identification storing unit, the image forming method comprising:

storing, in the identification storing unit, identification information in which a unit identification for identifying a print unit formed with at least one image, the image identification of the image included in the print unit, a medium identification for identifying a recording medium on which the image is printed, a print condition for the print unit, and user identification that includes a print user identification and a permitted-user identification, which corresponds to a user permitted by the print user to perform a function associated with the image, are associated with each other, the print user identification and the permitted-user identification corresponding to different users;

reading a code image in which the medium identification is coded from the recording medium;

detecting the medium identification from the code image read at the reading;

identification obtaining including obtaining the image identification of all images included in the print unit that is identified by the unit identification corresponding to the medium identification detected at the detecting and the print condition corresponding to the medium identification, from the identification storing unit;

image obtaining including obtaining all images corresponding to the image identification obtained at the identification obtaining from the image storing unit; and printing the image obtained at the image obtaining under the print condition obtained at the identification obtaining.

* * * * *